US010048083B2

(12) United States Patent
Inoue et al.

(10) Patent No.: US 10,048,083 B2
(45) Date of Patent: Aug. 14, 2018

(54) VEHICLE INFORMATION PROVIDING DEVICE

(71) Applicant: Nissan Motor Co., Ltd., Kanagawa (JP)

(72) Inventors: Hirofumi Inoue, Kanagawa (JP); Daisuke Saito, Kanagawa (JP); Toshiro Muramatsu, Kanagawa (JP)

(73) Assignee: NISSAN MOTOR CO., LTD., Kanagawa (JP)

( * ) Notice: Subject to any disclaimer, the term of this patent is extended or adjusted under 35 U.S.C. 154(b) by 0 days.

(21) Appl. No.: 15/114,866

(22) PCT Filed: Dec. 16, 2014

(86) PCT No.: PCT/JP2014/083255
§ 371 (c)(1),
(2) Date: Jul. 28, 2016

(87) PCT Pub. No.: WO2015/118780
PCT Pub. Date: Aug. 13, 2015

(65) Prior Publication Data
US 2017/0010116 A1    Jan. 12, 2017

(30) Foreign Application Priority Data
Feb. 7, 2014    (JP) ................................ 2014-022320

(51) Int. Cl.
*G01C 21/34*    (2006.01)
*B60L 1/00*    (2006.01)
(Continued)

(52) U.S. Cl.
CPC .......... *G01C 21/3484* (2013.01); *B60L 1/003* (2013.01); *B60L 1/06* (2013.01);
(Continued)

(58) Field of Classification Search
CPC . F02D 29/02; G01C 21/3476; G01C 21/3484; G01C 21/3492; G01C 21/3617; B60L 1/003; Y02T 10/7044
(Continued)

(56) References Cited

U.S. PATENT DOCUMENTS 5,487,002 A * 1/1996 Diller .................. B60L 1/003
320/128
2010/0131139 A1   5/2010 Sakai et al.
(Continued)

FOREIGN PATENT DOCUMENTS

JP    2011-027507 A    2/2011
JP    2012-181183 A    9/2012
(Continued)

OTHER PUBLICATIONS

International Preliminary Report on Patentability issued in corresponding Application No. PCT/JP2014/083255, dated Aug. 11, 2016 (8 pages).

*Primary Examiner* — Isaac G Smith
(74) *Attorney, Agent, or Firm* — Osha Liang LLP

(57) ABSTRACT

A vehicle information providing device has a history information accumulation unit configured to sequentially acquire at least one of driving location information, power consumption information and charging facility information from an in-vehicle device of a vehicle having at least an electric motor as a traveling drive source and accumulate the at least one information as driving history information, an input unit configured to input at least a departure point and a destination point, a planned route acquisition unit configured to acquire a planned route from the departure point to the destination point, and a map memory configured to store a control map in which a route of section and a characteristic value are associated with each other on a basis of the driving history information accumulated in the history information accumulation unit.

6 Claims, 14 Drawing Sheets

(51) Int. Cl.
*B60L 1/06* (2006.01)
*B60L 3/12* (2006.01)
*B60L 7/12* (2006.01)
*B60L 11/18* (2006.01)

(52) U.S. Cl.
CPC ............... *B60L 3/12* (2013.01); *B60L 7/12* (2013.01); *B60L 11/1838* (2013.01); *B60L 11/1861* (2013.01); *G01C 21/3469* (2013.01); *B60L 2240/12* (2013.01); *B60L 2240/14* (2013.01); *B60L 2240/34* (2013.01); *B60L 2240/622* (2013.01); *B60L 2240/642* (2013.01); *B60L 2240/662* (2013.01); *B60L 2240/72* (2013.01); *B60L 2240/80* (2013.01); *B60L 2250/12* (2013.01); *B60L 2250/14* (2013.01); *B60L 2250/16* (2013.01); *B60L 2250/20* (2013.01); *B60L 2260/52* (2013.01); *B60L 2260/54* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01)

(58) Field of Classification Search
USPC .................................................. 701/410, 424
See application file for complete search history.

(56) References Cited

U.S. PATENT DOCUMENTS

| | | | |
|---|---|---|---|
| 2011/0224900 A1* | 9/2011 | Hiruta | G01C 21/3469 701/533 |
| 2011/0288765 A1* | 11/2011 | Conway | G01C 21/3469 701/533 |
| 2012/0136574 A1 | 5/2012 | Kobayahsi et al. | |
| 2012/0203409 A1* | 8/2012 | Sekijima | G01C 21/3469 701/22 |
| 2013/0261953 A1* | 10/2013 | Kiyama | G01C 21/3476 701/400 |
| 2015/0142305 A1 | 5/2015 | Kubo | |
| 2015/0177009 A1 | 6/2015 | Saito et al. | |

FOREIGN PATENT DOCUMENTS

| | | |
|---|---|---|
| JP | 2013-210281 A | 10/2013 |
| JP | 2014-016172 A | 1/2014 |
| WO | 2010/137307 A1 | 12/2010 |
| WO | 2013/108246 A2 | 7/2013 |
| WO | 2014/020887 A1 | 2/2014 |

* cited by examiner

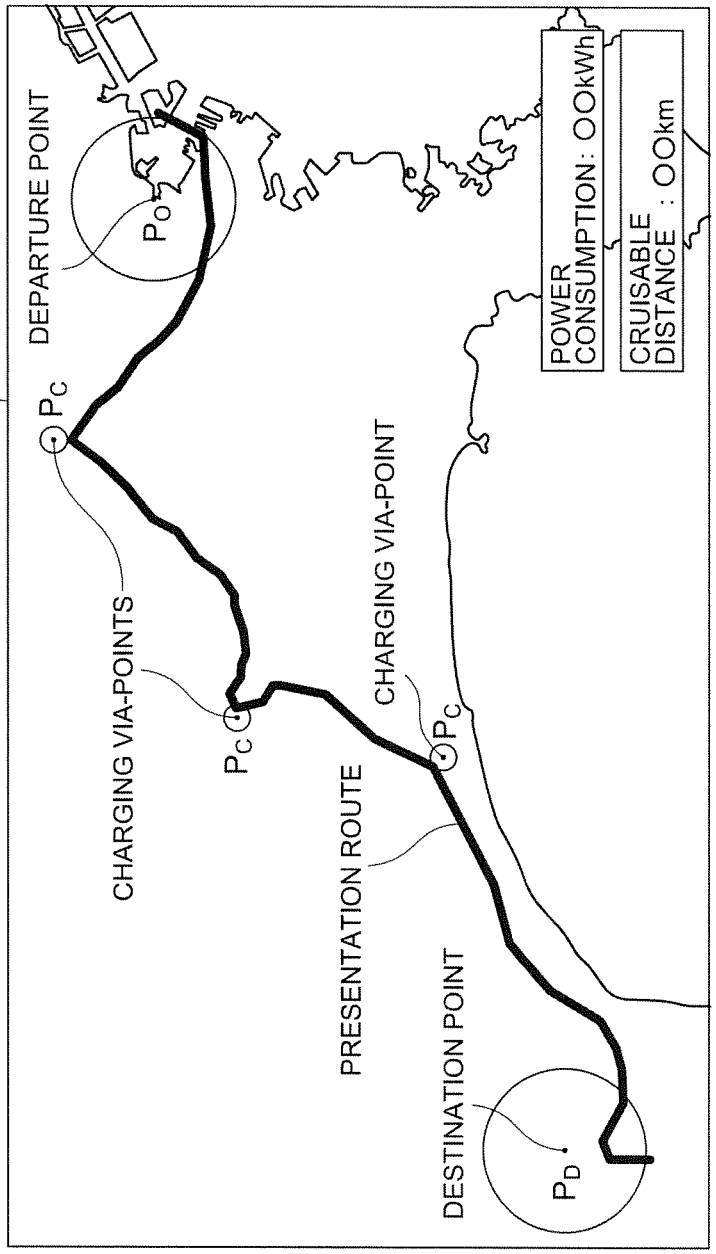

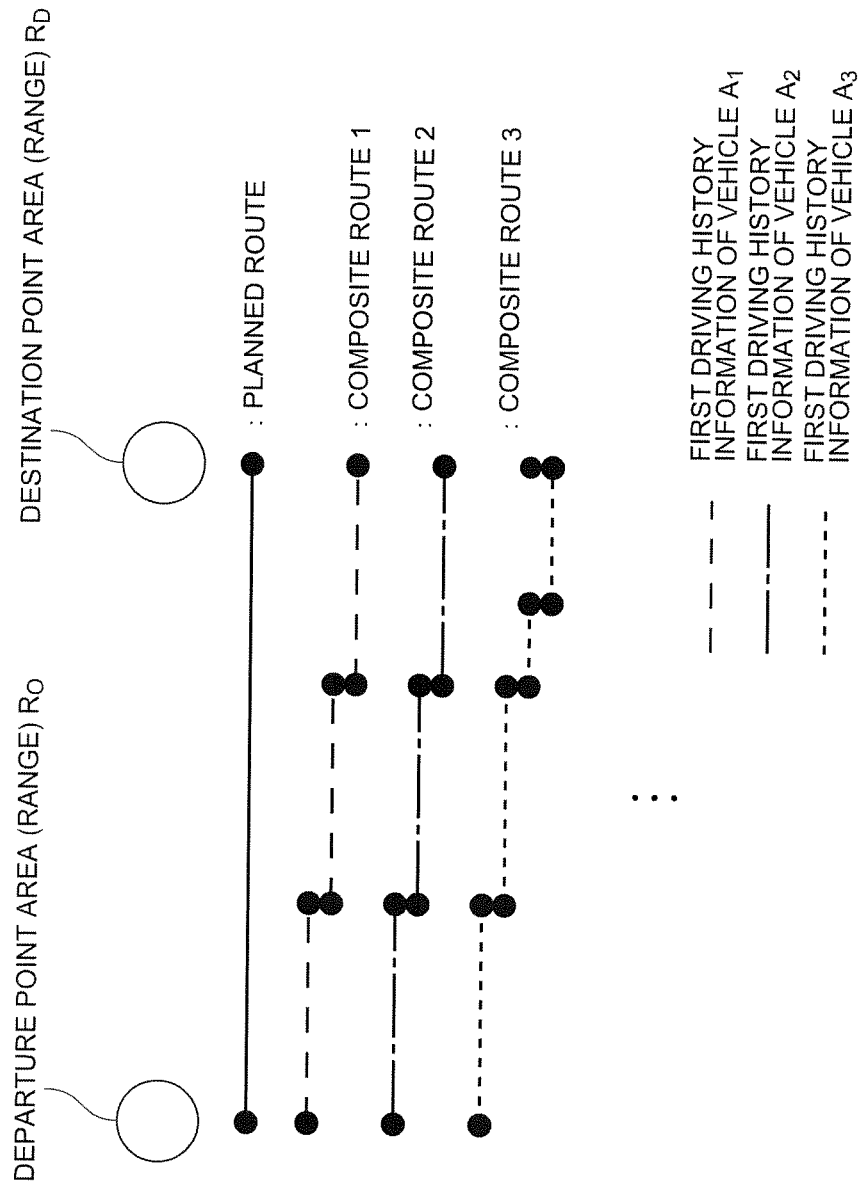

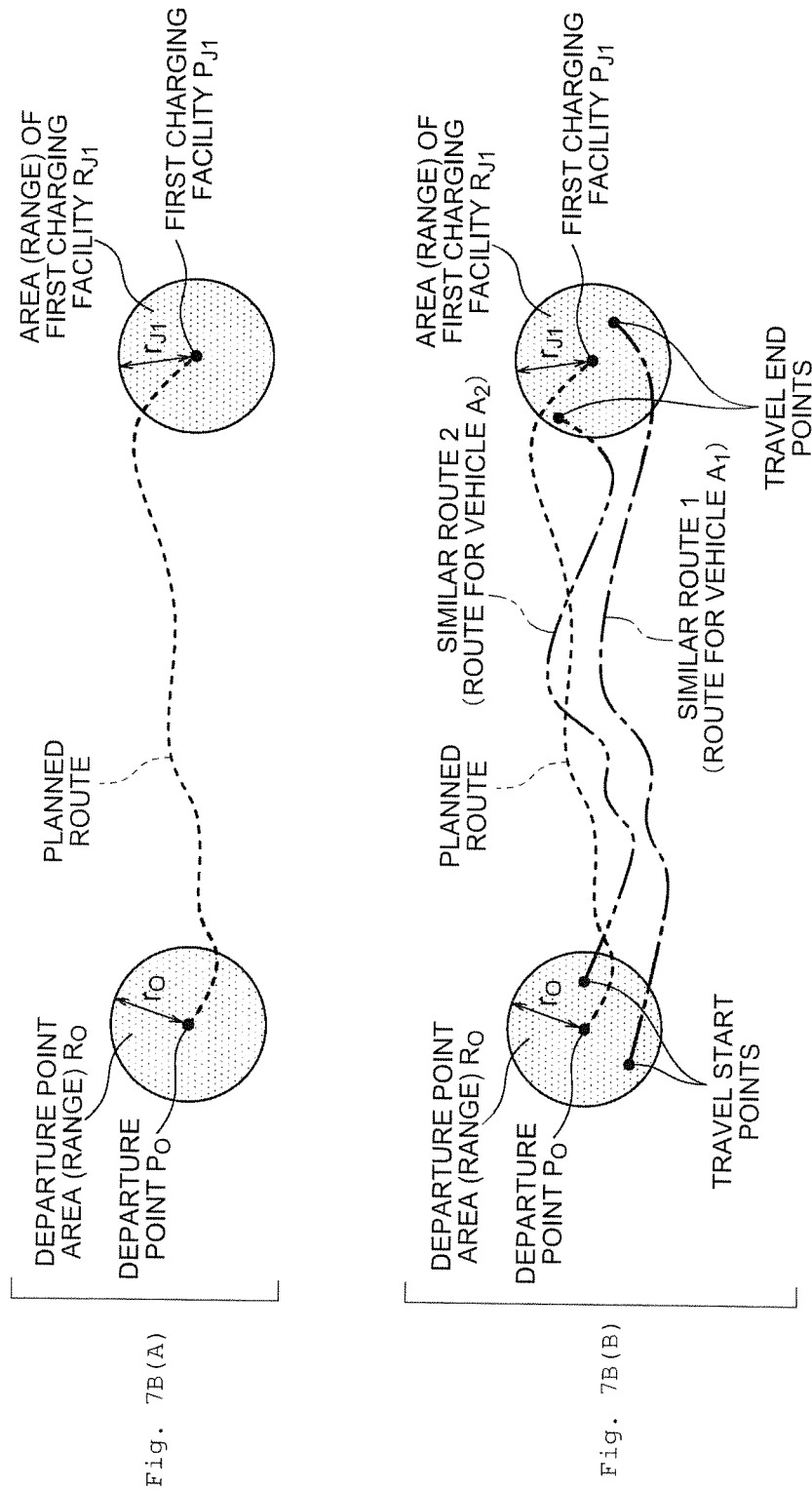

VEHICLE INFORMATION PROVIDING DEVICE

CROSS-REFERENCE TO RELATED APPLICATIONS

This application is a national stage application of PCT/JP2014/083255 filed Dec. 16, 2014, and claims foreign priority to Japanese Patent Application No. 2014-022320, filed on Feb. 7, 2014, the contents which are incorporated herein by reference in their entirety.

BACKGROUND

Technical Field

The present invention relates to a vehicle information providing device that provides power consumption information and charging via-point information when a vehicle having at least an electric motor as a traveling drive source travels to a destination point.

Related Art

A conventional technique, in accordance with a route to a destination point obtained by searching, provides information required for a vehicle to complete travel along the route or information required for the vehicle to economically travel (see Patent Document 1, for example). Patent Document 1 discloses conducting virtual competition between the fuel consumption of a host vehicle in a traveling section and the fuel consumption of another vehicle in the same section and providing the comparison result to the driver, in order to encourage the driver to enhance awareness of eco-driving.
Patent Document 1: JP 2011-27507 A

SUMMARY

In the conventional technique, comparison of the fuel consumption (or energy efficiency in case of EVs) is merely performed in each traveling section on the basis of the vehicle data of vehicles which is stored in a storage unit of a navigation server. In a long travel that requires traveling through charging facilities, unfortunately, a route cannot be selected which allows a travel with efficient power consumption over the entire route.

A vehicle information providing device according to one or more embodiments of the present invention may select a route which allows a travel with efficient power consumption even during a long travel.

The vehicle information providing device according to one or more embodiments of the present invention includes a charging necessity determining unit that refers to driving history information, which is accumulated in a history information accumulation unit, to determine whether or not a vehicle has to stand in charging facilities when the vehicle travels from a departure point to a destination point. In addition, the vehicle information providing device includes a map memory that stores a control map in which a route of section and a characteristic value are associated with each other. The route of section connects any two charging facilities (which are included in a charging facility group to which a plurality of charging facilities belongs). The characteristic value correlates with power consumption of an electric motor when the vehicle travels along the route of section.

When the charging necessity determining unit determines that the vehicle has to stand in the charging facilities, the vehicle information providing device according to one or more embodiments of the present invention refers to the control map stored by the map memory to combine a plurality of the routes of sections and search for a presentation route. This allows a travel with efficient power consumption along the routes of sections, so that a route of efficient power consumption can be selected even during a long travel.

BRIEF DESCRIPTION OF DRAWINGS

FIG. 2A is a view illustrating an example of the contents displayed by the display of FIG. 1.

FIG. 6B is a view for explaining composite routes.

FIGS. 7B(A)-7B(B) are views for explaining a search method for similar routes.

DETAILED DESCRIPTION

Hereinafter, embodiments of the present invention will be described with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

<Vehicle Information Providing System S>

Figure 1:
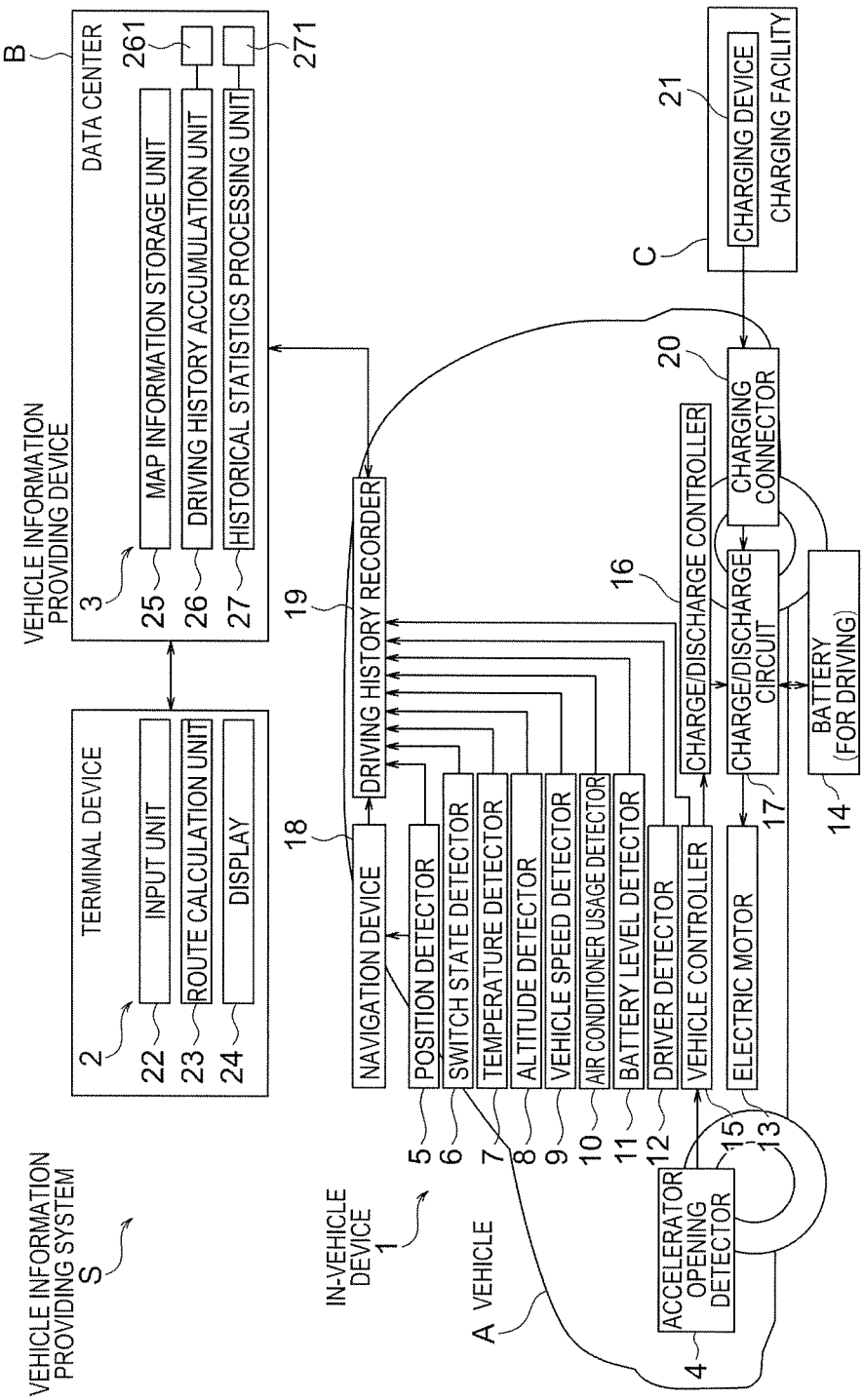
FIG. 1 is a block diagram illustrating a vehicle information providing system S having a vehicle information providing device according to one or more embodiments of the present invention.

FIG. 1 is a block diagram illustrating the configuration of a vehicle information providing system S according to one or more embodiments of the present invention. As illustrated in FIG. 1, the vehicle information providing system S of one or more embodiments of the present invention includes an in-vehicle device 1 that is mounted to each vehicle A with an electric motor 13 as a traveling drive source (there may be a plurality of vehicles A), a terminal device 2 carried by the owner of the vehicle A, and a vehicle information providing device 3 owned by a data center B. The terminal device 2 in this example may be included in a navigation device 18 of the in-vehicle device 1, as will be described later. Here and hereinafter, however, one or more embodiments of the present invention will be described on the assumption that the terminal device 2 is separate from the in-vehicle device 1. The vehicles A may include not only electric cars with only electric motors 13 as the traveling drive sources but also hybrid cars with both electric motors 13 and internal-combustion engines as the traveling drive sources. Note, however, that one or more embodiments of the present invention will be described for the electric cars with only electric motors 13 as the traveling drive sources, and specific structures and the like of the hybrid cars will be otherwise stated as necessary.

The in-vehicle device 1 and the vehicle information providing device 3, as well as the terminal device 2 and the vehicle information providing device 3, send and receive various types of information via respective communication lines. Examples of the communication lines include a cellular telephone network, a wireless LAN network, a DSRC (Dedicated Short-Range Communications) network, a power line communication network, etc. Each of the in-vehicle device 1 and the vehicle information providing device 3 may store various types of information in a removable storage medium, such as flash memory, and send and receive the stored various types of information via a terminal having a communication function.

<In-Vehicle Device 1>

The in-vehicle device 1 of one or more embodiments of the present invention is composed of hardware including a ROM that stores processing programs, a RAM for temporarily storing each data item, and a CPU that executes calculation processes in accordance with the processing programs. From a functional perspective, the in-vehicle device 1 of one or more embodiments of the present invention includes an accelerator opening detector 4, a position detector 5, a switch state detector 6, a temperature detector 7, an altitude detector 8, a vehicle speed detector 9, an air conditioner usage detector 10, a battery level detector 11, and a driver detector 12.

The accelerator opening detector 4 detects the accelerator opening of a host vehicle A and outputs the information regarding the detection results to a vehicle controller 15 described below. The position detector 5 detects the current position of the host vehicle A (for example, the latitude and longitude) on the basis of a GPS signal received from a GPS (Global Positioning System), and outputs the information regarding the detection results to a navigation device 18 described below.

The switch state detector 6 detects the switch state of a power switch of the host vehicle A (ignition switch when the host vehicle A is a hybrid car) and outputs the information regarding the detection results to a driving history recorder 19 described below. The switch states of the power switch may be, for example, an ON state in which the power supply from a battery (for driving) 14 is permitted and an OFF state in which the power supply from the battery 14 is prohibited. The temperature detector 7 detects the temperature (such as outside air temperature) at the current position of the host vehicle A and outputs the information regarding the detection results to the driving history recorder 19 described below.

The altitude detector 8 detects the altitude (distance from the mean sea level in the vertical direction, i.e. height above sea level) of the current position of the host vehicle A and outputs the information regarding the detection results to the driving history recorder 19 described below. The vehicle speed detector 9 detects the vehicle speed of the host vehicle A and outputs the information regarding the detection results to the driving history recorder 19 described below. The air conditioner usage detector 10 detects the air conditioner usage of the host vehicle A and outputs the information regarding the detection results to the driving history recorder 19 described below. In an electric car with only the electric motor 13 as the traveling drive source, the compressor for cooling may be driven by another electric motor than the electric motor 13, and an electric heater may be used as the heater for air heating, thus the air conditioner system also consumes the electric power unlike in a vehicle with an internal-combustion engine as the traveling drive source. Therefore, the air conditioner usage in the vehicle A may be, for example, the electric power that is consumed by the compressor for cooling and the heater for air heating.

The battery level detector 11 detects the battery level of the vehicle A and outputs the information regarding the detection results to the driving history recorder 19 described below. The battery level in this example may be the remaining charge of the battery (for driving) 14 to supply electric power to the electric motor 13 which is the traveling drive source. The driver detector 12 detects the driver ID (unique identifier) of the driver of the host vehicle A and outputs the information regarding the detection results to the driving history recorder 19 described below. The driver ID may be, for example, a number, etc. for uniquely identifying the driver.

The in-vehicle device 1 of one or more embodiments of the present invention further includes a vehicle controller 15, a charge/discharge controller 16, a charge/discharge circuit 17, a navigation device 18, and a driving history recorder 19.

The vehicle controller 15 acquires the information (accelerator opening) output by the accelerator opening detector 4 and outputs the acquired information to the driving history recorder 19. On the basis of the acquired information (accelerator opening), the vehicle controller 15 outputs a control command to the charge/discharge controller 16 to supply electric power that corresponds to the accelerator opening to the electric motor 13.

Following the control command from the vehicle controller 15, the charge/discharge controller 16 outputs a control command to the charge/discharge circuit 17 to supply the electric power that is stored by the battery (for driving) 14 to the electric motor 13. Additionally, the charge/discharge controller 16 detects the charging state and charging time of the battery 14 and outputs the information regarding the detection results to the driving history recorder 19. Charging states may be, for example, the distinction between currently charging and not currently charging. The charging time may be, for example, the time from starting the charging to finishing the charging.

The charge/discharge circuit 17 supplies the electric power stored by the battery (for driving) 14 to the electric motor 13, following the control command from the charge/discharge controller 16. The electric motor 13 thereby generates a traveling drive force. In the reverse action, the charge/discharge circuit 17 charges the battery 14 with the regenerative power generated in the electric motor 13, following the control command from the charge/discharge controller 16. The charge/discharge circuit 17 is to be connected to a charging device 21 via a charging connector 20. This type of charging device 21 may be, for example, a device that supplies electric power for charging the battery 14. This device may be provided in a charging facility C that is provided outside the vehicle A. The charging device 21 being connected to the charging connector 20 allows the charge/discharge circuit 17 to be supplied with the electric power from the charging device 21, and the battery 14 is thereby charged.

The navigation device 18 acquires the information that is output by the position detector 5, i.e. the latitude and longitude that represent the current position of the vehicle A, and presents to the driver the guidance information for guiding the vehicle A in accordance with a guidance route from a departure point $P_O$ to a destination point $P_D$, which are input by the driver, on the basis of the acquired information (the latitude and longitude that represent the current position of the vehicle A). The navigation device 18 outputs the acquired information and the guidance route to the driving history recorder 19.

The driving history recorder 19 executes a driving history information recording process on the basis of the information output by the various detectors 6 to 12, vehicle controller 15, charge/discharge controller 16, and navigation device 18.

The driving history information recording process is a process to record first driving history information (information that includes basic travel time information, movement information, and vehicle state information, cf. steps S102 to S105 of FIG. 3) and second driving history information (information that includes basic charge time information and charging information, cf. steps S108 to S110 of FIG. 3), both of which will be described below. The driving history recorder 19 transmits the recorded first driving history information and second driving history information to the vehicle information providing device 3. Details of the first driving history information, the second driving history information, and the driving history information recording process will be described below. The basic travel time information of the first driving history information is information that includes the vehicle ID information, the driver ID information, the temperature information, and the current date and time information. The movement information of the first driving history information is information that includes the latitude and longitude information, the altitude information, and the route information (driving location information). The vehicle state information of the first driving history information is information that includes the vehicle speed information, the accelerator opening information, the air conditioner usage information, and information regarding the power consumption (power consumption information). The basic charge time information of the second driving history information is information that includes the temperature information and the current date and time information. The charging information of the second driving history information is information that includes the latitude and longitude information (charging via-point information, charging position information), the charging amount information, and the charging time information.

<Terminal Device 2>

The terminal device 2 is composed of hardware including a ROM that stores processing programs, a RAM for temporarily storing each data item, and a CPU that executes calculation processes in accordance with the processing programs. From a functional perspective, the terminal device 2 includes an input unit 22 for destination points, etc., a route calculation unit 23, and a display 24. The terminal device 2 may be, for example, a mobile phone terminal, a personal computer, etc. carried by the owner of the vehicle A.

The input unit 22 receives an input of the departure point $P_O$, the destination point $P_D$, the via-points, the battery level (for example, the battery level of the battery (for driving) 14 of the vehicle A owned by the user), and the driver ID (for example, the driver ID that identifies the user) from the user of the terminal device 2. Then, the input unit 22 outputs the received information regarding the departure point $P_O$, the destination point $P_D$, the via-points, the battery level, and the driver ID to the route calculation unit 23.

The route calculation unit 23 executes a route providing process on the basis of the information output from the input unit 22, specifically, information regarding the departure point $P_O$ and the destination point $P_D$. In this route providing process, the route calculation unit 23 transmits the search request for a presentation route (hereinafter also referred to as a "presentation route search request") to the vehicle information providing device 3. Next, the route calculation unit 23 receives information regarding the presentation route, information regarding the power that is consumed when driving along the presentation route, and information regarding the locations of the charging facilities C (hereinafter also referred to as "charging via-points $P_C$") that will be traversed when driving along the presentation route, from the vehicle information providing device 3. The route calculation unit 23, upon receiving these pieces of the information from the vehicle information providing device 3, outputs a control signal for displaying the received information to the display 24. In other words, the vehicle information providing system S of one or more embodiments of the present invention is a system that, when a user inputs a departure point and a destination point at the time of starting to drive an electric car, searches for a presentation route similar to the user's planned route on the basis of the actual driving data which has been accumulated before, and encourages the user to know the power consumption and the charging facilities that will be traversed in addition to the presentation route. This allows the user to confirm in advance whether the driving plan is appropriate. Details of the route providing process will be described below.

In one or more embodiments of the present invention, the presentation route refers to a route that is provided from the vehicle information providing device 3 which refers to the driving history information for the input departure point and destination point and if necessary for various via-points. In contrast, the planned route refers to a route that is determined in accordance with predetermined conditions, such as distance and time, for the input departure point and destination point and if necessary for various via-points. Routes are referred to as including the presentation route and the planned route. In one or more embodiments of the present invention, an example is described in which the terminal device 2 executes the route providing process, but another configuration can also be employed. For example, the position detector 5, the route calculation unit 23, and the display 24 may be realized using the navigation device 18 provided in the vehicle A, which can thereby execute the route providing process.

FIG. 2A is a view illustrating an example of the contents displayed by the display 24 of the terminal device 2. As illustrated in FIG. 2A, the display 24 renders on an electronic map the departure point $P_O$, the destination point $P_D$, the presentation route therebetween, and the charging via-points $P_C$ which will be traversed when driving along the presentation route, in accordance with the control command output by the route calculation unit 23. In addition, the display 24 displays the information regarding the power that is consumed when driving along the presentation route and the information regarding the cruisable distance on a corner of the screen. This allows the user of the terminal device 2 to confirm in advance the power consumption, the cruisable distance, and the charging via-points $P_C$ when driving the vehicle A to the destination point $P_D$.

<Vehicle Information Providing Device 3>

Referring again to FIG. 1, the vehicle information providing device 3 installed in the data center B is composed of hardware including a ROM that stores processing programs, a RAM for temporarily storing each data item, and a CPU that executes calculation processes in accordance with the processing programs. From a functional perspective, the vehicle information providing device 3 includes a map information storage unit 25, a driving history accumulation unit 26, and a historical statistics processing unit 27. The map information storage unit 25 preliminarily stores map information of the electronic map for the region where the vehicle A is traveling. The map information may be, for example, information regarding nodes and links that represent a road network, information regarding the locations of charging facilities for charging the battery (for driving) 14 provided in the vehicle A, and information regarding toll roads and the locations of facilities that are attached to the toll roads.

Figure 3:
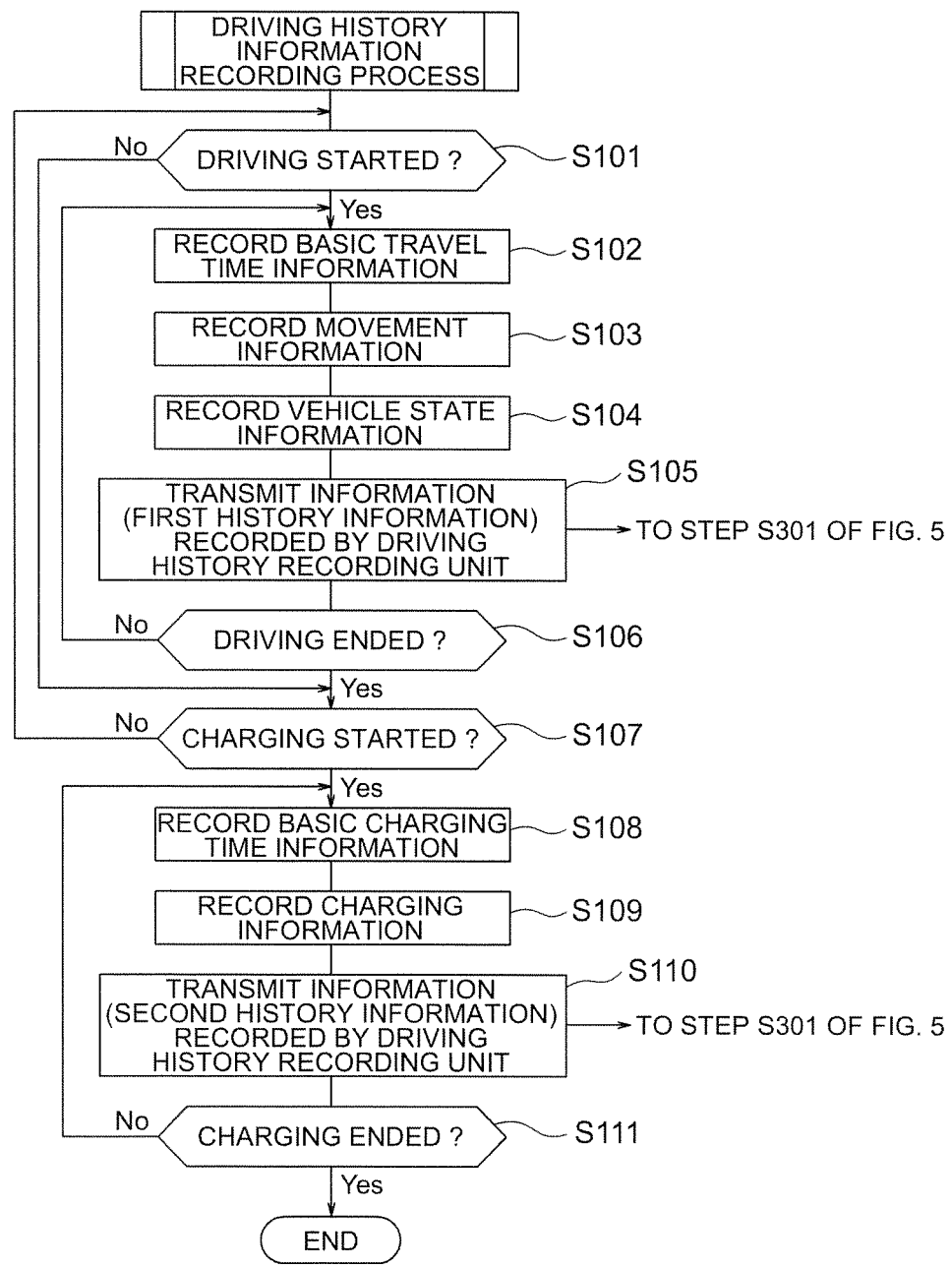
FIG. 3 is a flowchart illustrating a procedure of the driving history information recording process executed by the driving history recorder of FIG. 1 (subroutine of step S10 of FIG. 2C).

The driving history accumulation unit 26 executes a history information accumulation process on the basis of the first driving history information (information that includes basic travel time information, movement information, and vehicle state information, cf. steps S102 to S105 of FIG. 3) and the second driving history information (information that includes basic charge time information and charging information, cf. steps S108 to S110 of FIG. 3) which are transmitted from the in-vehicle device 1. Specifically, in the history information accumulation process, the driving history accumulation unit 26 sequentially receives (acquires) the first driving history information and the second driving history information which are transmitted by the in-vehicle device 1. Then, the driving history accumulation unit 26 accumulates the received first driving history information and second driving history information as the driving history information.

Figure 2B:
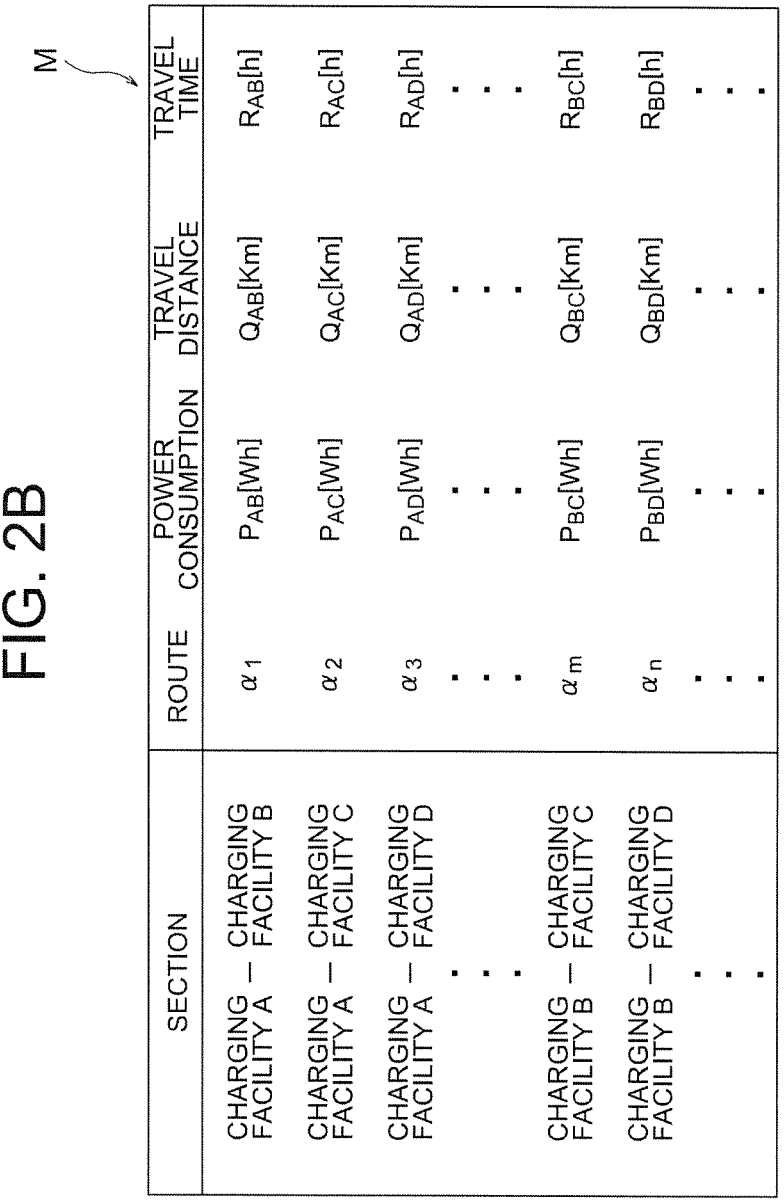
FIG. 2B is an image view illustrating a control map M stored by the map memory of FIG. 1.

In addition, the driving history accumulation unit 26 has a map memory 261 that stores a control map M (section-power consumption etc. control map) in which information regarding a route when each vehicle A travels between two charging facilities (hereinafter also referred to as a "route of section") and information regarding the power consumption, travel distance and travel time when the vehicle A travels along each route of section are associated with each other. As illustrated in FIG. 2B, this control map M associates a section (section between two charging facilities) along which each vehicle A travels with the route of section, power consumption, travel distance and travel time when the vehicle A travels along the section, on the basis of the first driving history information transmitted from the in-vehicle device 1. As will be understood, the above "power consumption, travel distance and travel time when the vehicle A travels along each route of section" correspond to an example of the "characteristic value correlating with power consumption of the electric motor when the vehicle travels along the route of section" of one or more embodiments of the present invention.

The historical statistics processing unit 27 executes a charging facility statistical process on the basis of the first driving history information and second driving history information transmitted from the in-vehicle device 1. Specifically, in the charging facility statistical process as illustrated in step S40 of FIG. 2C and FIG. 6A, the driving history accumulation unit 26 sequentially receives (acquires) the first driving history information and second driving history information transmitted by the in-vehicle device 1. Then, referring to the information accumulated in the driving history accumulation unit 26, the historical statistics processing unit 27 updates the control map M stored by the map memory 261, on the basis of the route, such as the route of section along which the vehicle A travels, and the power consumption information when the vehicle A travels along the route. Details of the charging facility statistical process will be described below.

In addition, the historical statistics processing unit 27 refers to the presentation route search request transmitted from the terminal device 2, the map information stored by the map information storage unit 25, and the driving history information (the first driving history information, the second driving history information) accumulated by the driving history accumulation unit 26 to execute a driving history statistical process. In this driving history statistical process, first, the historical statistics processing unit 27 refers to the map information stored by the map information storage unit 25 to search for and acquire a planned route from the departure point $P_O$ to the destination point $P_D$ on the basis of the presentation route search request transmitted from the route calculation unit 23. The planned route may be any route that allows arrival at the destination point $P_D$ from the departure point $P_O$ and is not particularly limited. For example, there is searched for a route that can be traveled between the departure point $P_O$ and the destination point $P_D$ in the shortest time or the shortest distance.

The historical statistics processing unit 27 has a charging frequency determining unit 271 that refers to the charging amount information detected by the battery level detector 11 of the vehicle A to determine how many times to have to stand in the charging facilities when the vehicle A travels along the planned route. Referring to the determination result by the charging frequency determining unit 271 and the driving history information (the first driving history information) accumulated by the driving history accumulation unit 26, the historical statistics processing unit 27 determines a presentation route that is the same as or similar to the searched (acquired) planned route.

Next, the historical statistics processing unit 27 refers to the driving history information (the first driving history information, the second driving history information) accumulated by the driving history accumulation unit 26 to determine the power that is actually consumed by the vehicle A when traveling along the determined presentation route and the charging via-points that will be traversed when driving along the presentation route. Then, the historical statistics processing unit 27 transmits (provides) the determined presentation route, the power consumption, and the charging via-point information to the in-vehicle device 1. The in-vehicle device 1 thereby presents information regarding the presentation route, the power that is consumed upon traveling along the presentation route, and the charging via-points that will be traversed when driving along the presentation route, on the basis of the information output by the historical statistics processing unit 27. Details of the driving history statistical process will be described below.

<Information Processing by Vehicle Information Providing System S>

Figure 2C:
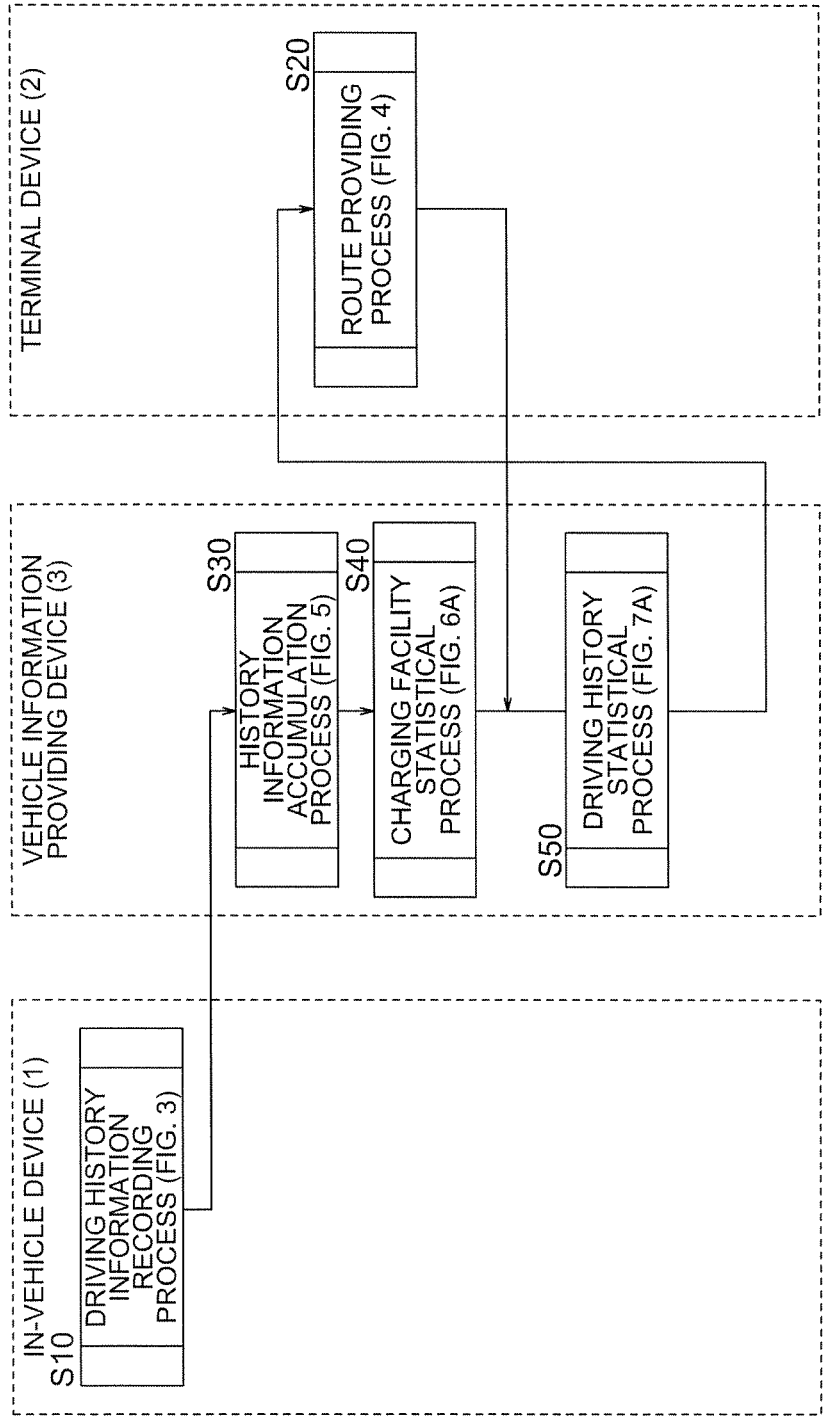
FIG. 2C is a flowchart illustrating procedures of various types of information processing executed by the in-vehicle device, terminal device and vehicle information providing device of the vehicle information providing system S of FIG. 1.

The vehicle information providing system S including the above-described in-vehicle device 1, terminal device 2, and vehicle information providing device 3 executes various types of information processing under the relationship illustrated in FIG. 2C. This will be more specifically described. The in-vehicle device 1 executes the driving history information recording process (step S10). The vehicle information providing device 3 executes the history accumulation process (step S30), the charging facility statistical process (step S40), and the driving history statistical process (step S50). The terminal device 2 executes the route providing process (step S20). The relationship among these steps S10, S20, S30, S40, and S50 will generally be described. In step S10, the in-vehicle device 1 provided in each of a plurality of vehicles A, A, . . . acquires the driving history information (the first driving history information which includes the basic travel time information, the movement information, and the vehicle state information and the second driving history information which includes the basic charge time information and the charging information) in accordance with the route for a host vehicle and transmits the driving history information to the vehicle information providing device 3. In step S30, the vehicle information providing device 3 receives such driving history information from the plurality of vehicles A, A, . . . and stores the driving history information, as well as extracts a route for traveling between two charging facilities from among the traveling histories and accumulates the information regarding the route of section. This allows the vehicle information providing device 3 to accumulate many pieces of the driving history information. On the other hand, in step S20, a user who is going to drive uses the terminal device 2 to input the departure point and the destination point and if necessary via-points and transmits the information regarding these destination point, destination point and via-points to the vehicle information providing device 3. In step S50, the vehicle information providing device 3 uses the information regarding these destination point, destination point and via-points to search for a route that is the same as or similar to the route (also referred to as a "planned route") from the accumulated driving history information, and transmits the hit route (also referred to as a "presentation route") and the driving history information relevant to the hit route to the terminal device 2. Then, in step S20, receiving the presentation route and the relevant information, the terminal device 2 displays these pieces of information. This allows the user to confirm, before the departure, the route in accordance with the departure point, destination point and via-points for the host vehicle as well as the power consumption information of the battery and information regarding the via-points for charging and the like. Hereinafter, subroutines of these driving history information recording process (step S10), route providing process (step S20), history accumulation process (step S30), charging facility statistical process (step S40), and driving history statistical process (step S50) will be described.

<Driving History Information Recording Process>

FIG. 3 is a flowchart illustrating a subroutine of the driving history information recording process (step S10) of FIG. 2C. The driving history information recording process is executed by the driving history recorder 19 of the in-vehicle device 1. The driving history recorder 19 executes the driving history information recording process each time a predetermined amount of time (for example, 10 milliseconds) has elapsed.

As illustrated in FIG. 3, in step S101, the driving history recorder 19 determines whether or not the driver has started driving the vehicle A. Specifically, the driving history recorder 19 determines whether or not the power switch is in an ON state, on the basis of the information (the switch state of the power switch) which is output by the switch state detector 6. Then, when a determination is made that the power switch is in the ON state (step S101=Yes), the driving history recorder 19 determines that the driver has started driving the vehicle A, and the process proceeds to step S102. On the other hand, when a determination is made that the power switch is in the OFF state (step S101=No), the driving history recorder 19 determines that the driver has not started driving the vehicle A, and the process proceeds to step S107.

In step S102 in which a determination is made that the driver has started driving the vehicle A, the driving history recorder 19 records the vehicle ID information, which specifies the vehicle A, the driver ID information, which is output from the driver detector 12, the temperature information, which is output from the temperature detection unit 7, and the current date and time information as the basic travel time information. That is, in one or more embodiments of the present invention, the basic travel time information is information that includes the vehicle ID information, the driver ID information, the temperature information, and the current date and time information. The current date and time information to be used may be date and time information that is obtained from a clock equipped in the vehicle A or date and time information that is included in the GPS signal detected by the position detector 5.

Next, the process proceeds to step S103, in which the driving history recorder 19 records the latitude and longitude information output from the position detector 5, the altitude information output from the altitude detection unit 8, and the route information (hereinafter also referred to as a "driving location information") as the movement information. That is, in one or more embodiments of the present invention, the movement information includes the latitude and longitude information, the altitude information, and the route information (the driving location information). For example, since the vehicle A is considered to be traveling along a guidance route that is presented by the navigation device 18, information that is output by the navigation device 18 (the guidance route) can be employed as the route.

The process then proceeds to step S104, in which the driving history recorder 19 records the accelerator opening information output from the accelerator opening detector 4, the altitude information output from the altitude detector 8, the vehicle speed information output from the vehicle speed detector 9, and the air conditioner usage information output from the air conditioner usage detector 10 as the vehicle state information. When traveling along the guidance route provided by the navigation device 18 has been completed, the driving history recorder 19 includes information regarding the power that was consumed upon traveling the guidance route (hereinafter also referred to as "power consumption information") in the vehicle state information to be recorded. That is, in one or more embodiments of the present invention, the vehicle state information includes the vehicle speed information, the accelerator opening information, the air conditioner usage information, and information regarding the power consumption (the power consumption information). In a calculation method for the power consumption, it can be calculated by subtracting the battery level at the time of reaching the destination point $P_D$ from the battery level at the time of departing from the departure point $P_O$ of the guidance route.

Figure 5:
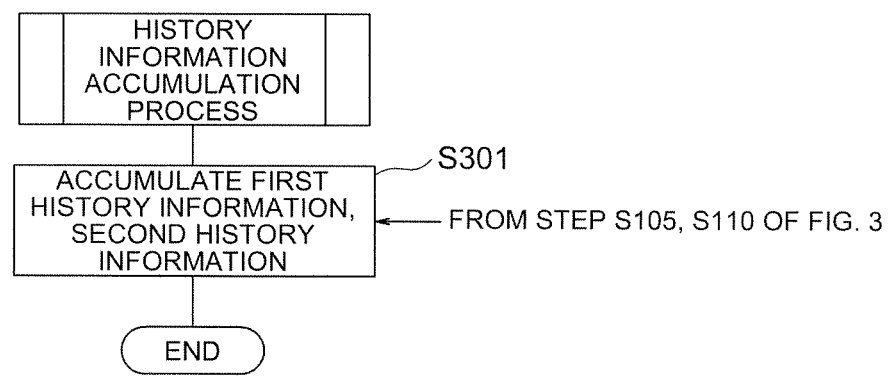
FIG. 5 is a flowchart illustrating a procedure of the history accumulation process executed by the driving history accumulation unit of FIG. 1 (subroutine of step S30 of FIG. 2C).

The process then proceeds to step S105, in which the driving history recorder 19 transmits information that includes the basic travel time information, movement information, and vehicle state information recorded by the driving history recorder 19 to the vehicle information providing device 3 as the first driving history information (the vehicle information providing device 3 receives and accumulates this information in step S301 of FIG. 5).

The process then proceeds to step S106, in which the driving history recorder 19 determines whether or not the driver has finished driving the vehicle A. Specifically, the driving history recorder 19 determines whether or not the power switch is in an OFF state, on the basis of the information regarding the switch state of the power switch which is output by the switch state detection unit 6. Then, when a determination is made that the power switch is in the OFF state (step S106=Yes), the driving history recorder 19 determines that the driver has finished driving the vehicle A, and the process proceeds to step S107. On the other hand, when a determination is made that the power switch is in the ON state (step S106=No), the driving history recorder 19 determines that the driver has not finished driving the vehicle A, and the process returns to step S102, from which the processes of steps S102 to S106 are repeatedly executed until a determination is made that the driver has finished driving the vehicle A.

In step S107 in which a determination is made that the driver has finished driving the vehicle A, the driving history recorder 19 determines whether or not the battery (for driving) 14 has started charging. Specifically, the driving history recorder 19 determines whether or not the battery 14 is in a charging state on the basis of the charging state information of the battery 14 which is output by the charge/discharge controller 16. Then, when a determination is made that the battery 14 is in a charging state (step S107=Yes), the driving history recorder 19 determines that the battery 14 has started charging, and the process proceeds to step S108. On the other hand, when a determination is made that the battery 14 is not in a charging state (step S107=No), the driving history recorder 19 determines that the battery 14 has not started charging, and the process returns to step S101, from which the processes of steps S101 and S107 are repeatedly executed until driving of the vehicle A has started (step S101=Yes) or until the charging of the battery 14 has started (step S107=Yes).

When the battery (for driving) 14 has started charging as determined in step S107, the process proceeds to step S108, in which the driving history recorder 19 records the temperature information output from the temperature detection unit 7, as well as the current date and time information, as the basic charge time information. That is, in one or more embodiments of the present invention, the basic charge time information includes the temperature information and the current date and time information.

Step S108 is followed by step S109, in which the driving history recorder 19 stores the latitude and longitude information (hereinafter also referred to as "charging via-point information" and/or "charging position information"), the charging amount information, and the charging time information, which are output from the position detector 5, the battery level detector 11, and the charge/discharge controller 16, as the charging information. That is, in one or more embodiments of the present invention, the charging information includes the latitude and longitude information (the charging via-point information and/or the charging position information), the charging amount information, and the charging time information.

The process then proceeds to step S110, in which the driving history recorder 19 transmits information that includes the basic charge time information and charging information recorded by the driving history recorder 19 to the vehicle information providing device 3 as the second driving history information (the vehicle information providing device 3 receives and accumulates this information in step S301 of FIG. 5). During this operation, the driving history recorder 19 transmits the second driving history information to the vehicle information providing device 3 so that the second driving history information is associated with the first driving history information transmitted in step S105 described above. This allows the association between the route that the vehicle A traveled and the charging via-points that were traversed when driving along the route.

The process then proceeds to step S111, in which the driving history recorder 19 determines whether or not the battery (for driving) 14 has finished charging. Specifically, the driving history recorder 19 determines whether or not the battery 14 is in a charging state on the basis of the charging state information of the battery 14 which is output from the charge/discharge controller 16. Then, when a determination is made that the battery 14 is not in a charging state (step S111=Yes), the driving history recorder 19 determines that the battery 14 has finished charging, and the driving history information recording process ends. On the other hand, when a determination is made that the battery 14 is in a charging state (step S111=No), the driving history recorder 19 determines that the battery 14 has not finished charging, and the process returns to step S108, from which the processes of steps S108 to Sill are repeatedly executed until a determination is made that the battery 14 has finished charging.

<Route Providing Process>

Figure 4:
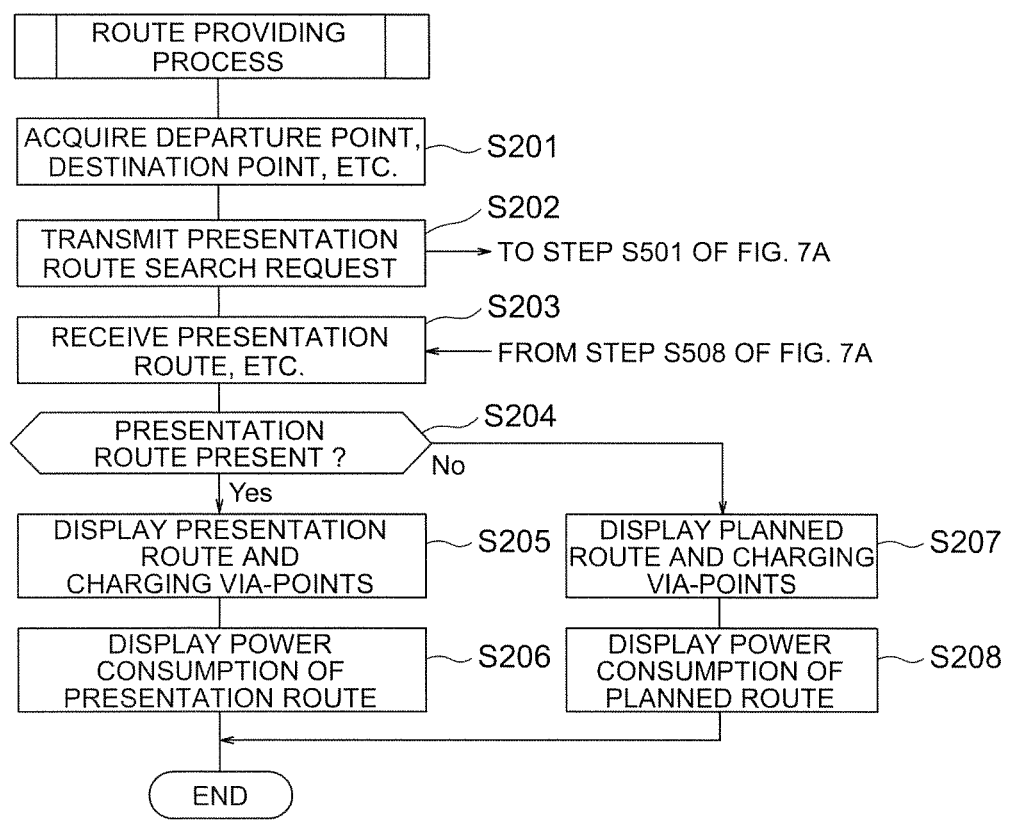
FIG. 4 is a flowchart illustrating a procedure of the route providing process executed by the route calculation unit of FIG. 1 (subroutine of step S20 of FIG. 2C).

FIG. 4 is a flowchart illustrating a subroutine of the route providing process (step S20) of FIG. 2C. The route providing process is executed by the route calculation unit 23 of the terminal device 2, and this route calculation unit 23 executes the route providing process described below when information regarding the departure point $P_O$, destination point $P_D$, battery level, and driver ID are input from the input unit 22.

First, in step S201, the route calculation unit 23 acquires information regarding the departure point $P_O$, destination point $P_D$, battery level, and driver ID output from the input unit 22, as illustrated in FIG. 4.

Step S201 is followed by step S202, in which the route calculation unit 23 transmits a presentation route search request to the vehicle information providing device 3. Specifically, the route calculation unit 23 transmits the presentation route search request, along with information regarding the departure point $P_O$, destination point $P_D$, battery level, and driver ID acquired in step S201 described above, to the vehicle information providing device 3 (the vehicle information providing device 3 receives this in step S501 of FIG. 7A).

After the presentation route search request is output from the route calculation unit 23 to the vehicle information providing device 3 in step S202, the vehicle information providing device 3 calculates and determines a presentation route in accordance with the processing procedure illustrated in FIG. 7A (steps S501 to S508), and transmits the presentation route to the route calculation unit 23 of the terminal device 2 (details will be described below with reference to FIG. 7A).

The process then proceeds to step S203, in which the route calculation unit 23 receives (from step S508 of FIG. 7A) information that includes the presentation route information, power consumption information, and charging via-point information transmitted by the vehicle information providing device 3. If a presentation route was not able to be determined in step S202, the route calculation unit 23 receives the planned route information instead of the presentation route information.

Step S203 is followed by step S204, in which the route calculation unit 23 determines whether or not the presentation route information was received in step S203. When the route calculation unit 23 determines that the presentation route information has been received (step S204=Yes), the process proceeds to step S205. On the other hand, when the route calculation unit 23 determines that the planned route information has been received instead of the presentation route information (step S204=No), the process proceeds to step S207.

When a determination is made that the presentation route information has been received, the process proceeds to step S205, in which the route calculation unit 23 outputs a control command to the display 24 to display the presentation route information and the charging via-point information among the information acquired in step S203 described above (the presentation route information, the power consumption information, and the charging via-point information).

Step S205 is followed by step S206, in which the route calculation unit 23 outputs a control command to the display 24 to display the power consumption information among the information acquired in step S203 described above (the presentation route information, the power consumption information, and the charging via-point information), and thereafter the route providing process ends. This allows the display as illustrated in FIG. 2A on the display screen.

On the other hand, when a determination is made that the presentation route information has not been received, the process proceeds to step S207, in which the route calculation unit 23 outputs a control command to the display 24 to display the planned route information and the charging via-point information among the information acquired in step S203 described above (the planned route information, the power consumption information, and the charging via-point information).

Step S207 is followed by step S208, in which the route calculation unit 23 outputs a control command to the display 24 to display the power consumption information among the information acquired in step S203 described above (the planned route information, the power consumption information, and the charging via-point information), and thereafter the route providing process ends. This allows the display as illustrated in FIG. 2A on the display screen.

<History Accumulation Process>

FIG. 5 is a flowchart illustrating a subroutine of the history accumulation process (step S30) of FIG. 2C. The history accumulation process is executed by the driving history accumulation unit 26 of the vehicle information providing device 3, and the driving history accumulation unit 26 executes the history accumulation process when receiving the first driving history information or the second driving history information from the route calculation unit 23.

In step S301 of FIG. 5, the driving history accumulation unit 26 accumulates the first driving history information or second driving history information received from the driving history recorder 19 of the in-vehicle device 1 as the driving history information, and the history accumulation process ends. During this operation, the driving history accumulation unit 26 includes information regarding the presence/absence of traffic jams, the day of the week, the season, the weather, the travel time zone, the power consumption of the air conditioner, the travel power consumption, and the average speed in the driving history information (the first driving history information, the second driving history information) to be accumulated.

Possible information regarding the presence/absence of traffic jams may be obtained, for example, by detecting the presence/absence of traffic jams on the traveling date/time and along the route, which are included in the first driving history information, and the detected information can be used. Information regarding the day of the week may be, for example, the day of the week to which the traveling date/time included in the first driving history information belongs. Information regarding the season may be, for example, the season to which the traveling date/time included in the first driving history information belongs. The weather on the traveling date/time and at the latitude and longitude, which are included in the first driving history information, may be detected, and the detected information can be used as the information regarding the weather.

Information regarding the time zone may be, for example, the time zone to which the traveling date/time included in the first driving history information belongs. Information regarding the power consumption of the air conditioner may be, for example, information regarding ON/OFF of the air conditioner and information regarding the power consumption per unit of time of the air conditioner, which are included in the first driving history information. Information regarding the travel power consumption may be, for example, the amount of decrease in the battery level per unit of time while traveling, which is included in the first driving history information. Information regarding the average speed may be, for example, the average value of the vehicle speed over a set period of time (for example, 10 minutes), which is included in the first driving history information.

In one or more embodiments of the present invention, an example has been described in which the driving history recorder 19 uses the guidance route information that is output from the navigation device 18 as the route, but another configuration may also be employed. For example, if the route in the first driving history information includes a portion for which the vehicle A actually traveled a different route, the driving history accumulation unit 26 corrects the above to the route that the vehicle A actually traveled, on the basis of the driving history information (the latitude and longitude), which is accumulated by the driving history accumulation unit 26. This allows the driving history accumulation unit 26 to accumulate information regarding the route that the vehicle A actually traveled.

As the information regarding the route that the vehicle A actually traveled, there can be employed i) a latitude and longitude sequence or a road link string after a common dead reckoning or ii) a latitude and longitude sequence or a road link string after map matching. The dead reckoning refers to location information that is obtained by, for example, correcting the GPS latitude and longitude detected by the position detector 5 in accordance with the speed information from the vehicle speed detection unit 9. A method for increasing the correction accuracy by considering the gyro-sensor (the acceleration sensor) information, which is not diagrammed, is also known, and such a method may be used. The map matching is known as a method for detecting the most likely location on a road after determining whether or not one is traveling on the road, and if on the road which road is passed, with reference to the GPS latitude and longitude detected by the position detector 5 or the latitude and longitude after the above dead reckoning and also with reference to the road link and node information possessed by the navigation device 18, and if during the navigation guidance, together with information regarding the guidance route.

<Charging Facility Statistical Process>

Figure 6A:
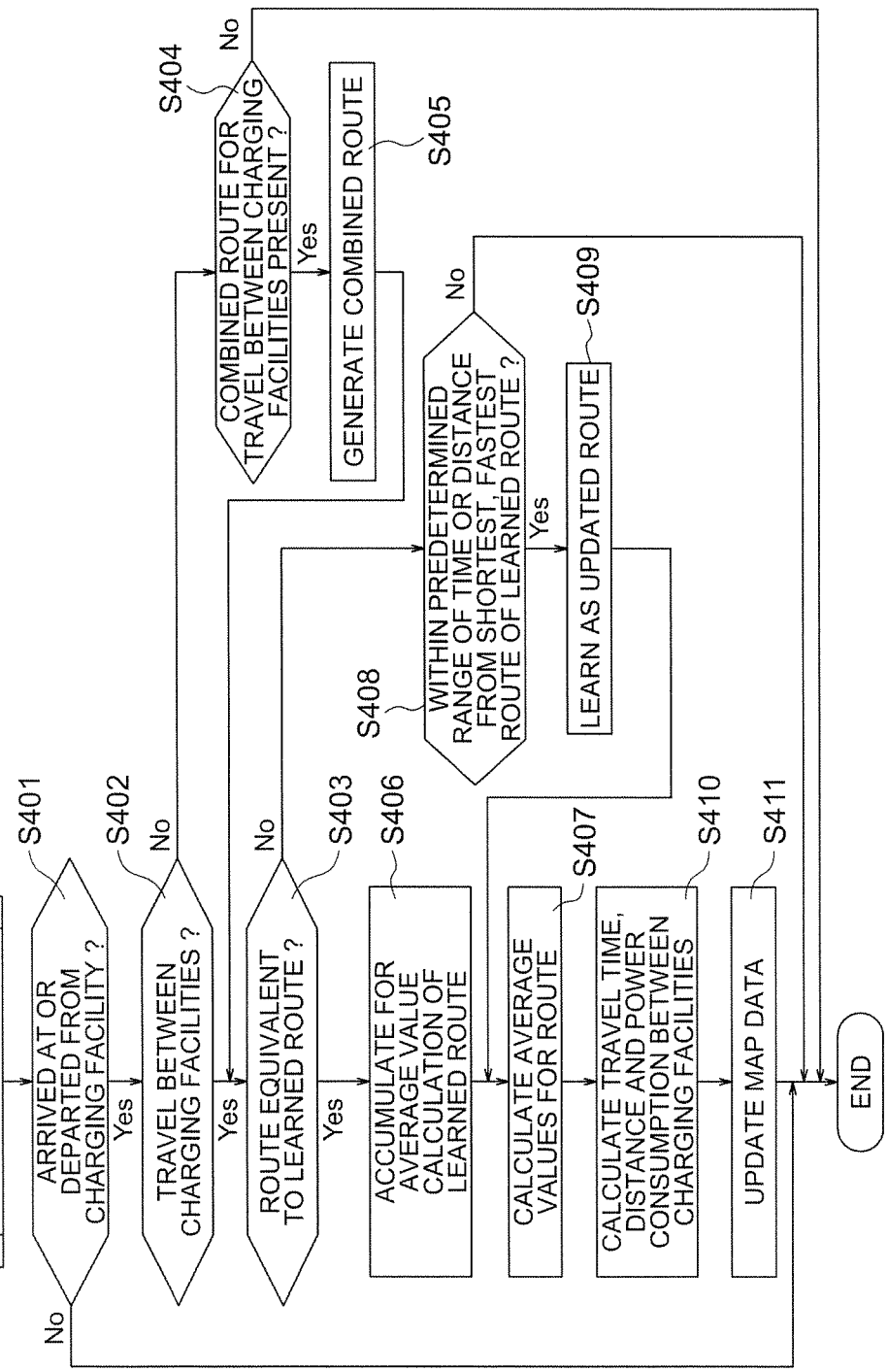
FIG. 6A is a flowchart illustrating a procedure of the charging facility statistical process executed by the historical statistics processing unit of FIG. 1 (subroutine of step S40 of FIG. 2C).
Figure 6C:
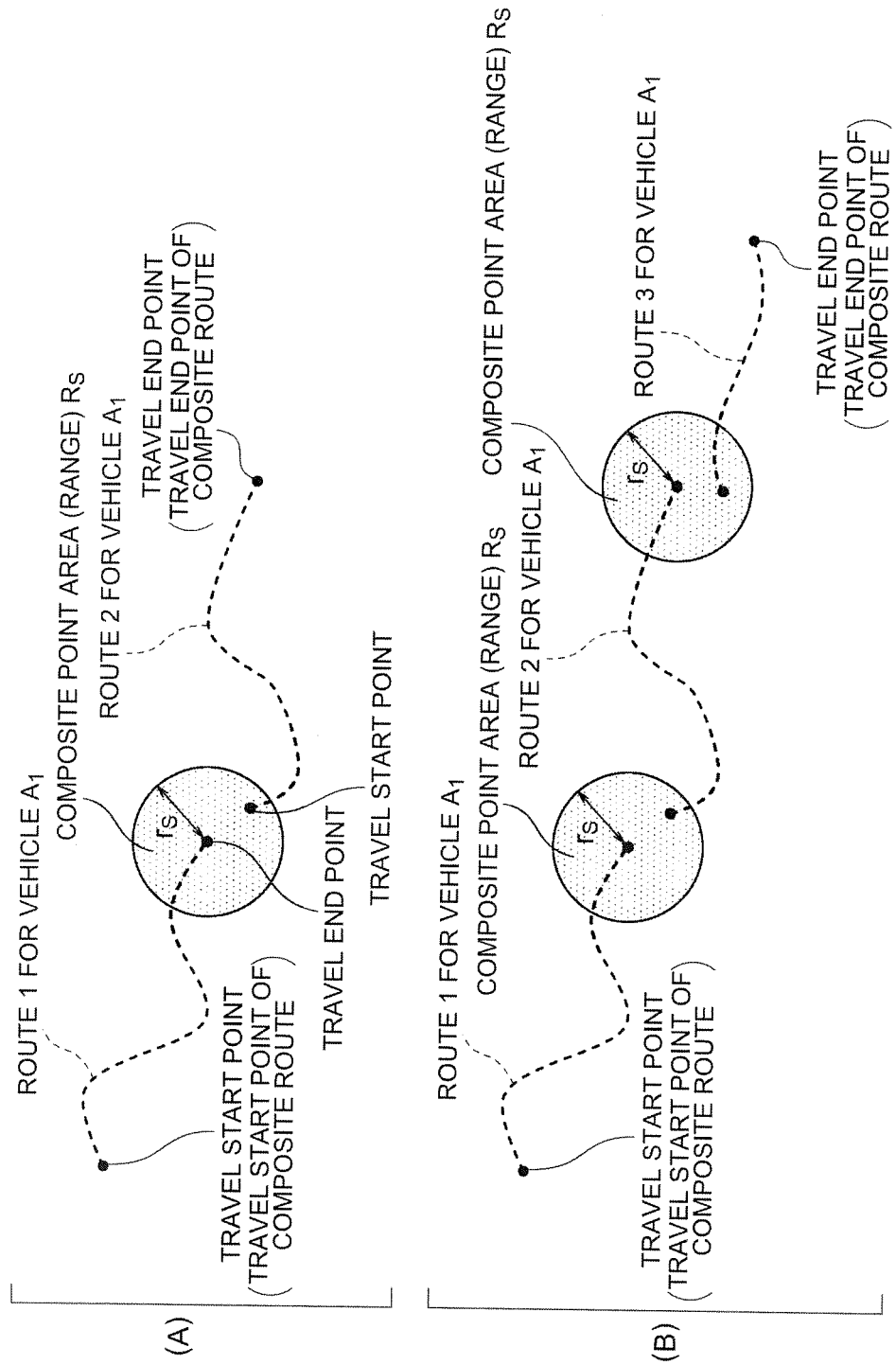
FIGS. 6C(A)-6C(B) are views for explaining examples of generation methods for composite routes.

FIG. 6A is a flowchart illustrating a subroutine of the charging facility statistical process (step S40) of FIG. 2C, FIG. 6B is a view for explaining composite routes, and FIGS. 6C(A)-6C(B) are views for explaining examples of generation methods for the composite routes. The charging facility statistical process is executed by the historical statistics processing unit 27 of the vehicle information providing device 3. The historical statistics processing unit 27 executes the charging facility statistical process after the above-described history accumulation process.

As illustrated in FIG. 6A, in step S401, the historical statistics processing unit 27 refers to the first driving history information and second driving history information accumulated by the driving history accumulation unit 26 to determine whether or not a travel start point or travel end point included in the driving history is a charging facility such as charging station. When the travel start point or travel end point included in the driving history is a charging facility (step S401=Yes), the process proceeds to step S402. When the travel start point or travel end point included in the driving history is not a charging facility (step S401=No), the charging facility statistical process ends without further processing.

In step S402, the historical statistics processing unit 27 refers to the first driving history information and second driving history information accumulated in the driving history accumulation unit 26 to determine whether or not routes included in the driving history include a route for traveling between charging facilities. When the routes included in the driving history include a route for traveling between charging facilities (step S402=Yes), the process proceeds to step S403. On the other hand, when the routes included in the driving history do not include a route for traveling between charging facilities (step S402=No), the process proceeds to step S404.

In step S404, the historical statistics processing unit 27 refers to the first driving history information and second driving history information accumulated in the driving history accumulation unit 26 to determine whether or not there is a combined route that allows travel between charging facilities when the combined route is generated so as to connect a plurality of routes. Here, FIG. 6B is an explanatory view representing combined routes. In step S404, when an end (departure point or destination point) of a route among a plurality of routes along which the same vehicle A has traveled is within a predetermined range of distance from an end (departure point or destination point) of another route, as illustrated in FIG. 6B, the historical statistics processing unit 27 combines these routes with each other at the ends to generate a combined route. Then, the historical statistics processing unit 27 determines whether or not the combined route is a route that allows travel between charging facilities. Routes along which different vehicles A have traveled may be combined with each other. In this case, according to one or more embodiments of the present invention, routes are combined along which the vehicles A have traveled under similar conditions (such as the type of vehicle and the season, weather and travel time zone when traveling). When two routes are combined, in one or more embodiments of the present invention, the departure point of one route is combined with the destination point of the other route. This is because, even when the locations of two ends (departure point and destination point) and the traveling path therebetween are the same between the routes, the power consumption of the battery may be different between when traveling from one end to the other end and when traveling from the other end to the one end. For example, when the altitudes of two ends are different, uphills turn to downhills, so that the battery consumes more power as the number of uphills increases. Even when the altitudes of two ends are the same, the degree of traffic jams may be different between the inbound lanes and the outbound lanes, and a larger degree of traffic jams prolongs the traveling time to cause the battery to consume more power. The traveling directions in the driving history being made the same allow correct provision of such information regarding the power consumption.

In step S404, when a determination is made that there is not a combined route that can be a route for traveling between charging facilities (step S404=No), the charging facility statistical process ends. On the other hand, in step S404, when a determination is made that there is a combined route that can be a route for traveling between charging facilities (step S404=Yes), the process proceeds to step S405.

In step S405, the historical statistics processing unit 27 performs generation of a combined route. FIGS. 6C(A)-6C(B) are views for explaining examples of generation methods for combined routes. When generating a combined route, first, the historical statistics processing unit 27 refers to the first driving history information accumulated in the driving history accumulation unit 26 to extract a freely selected route from among the routes along which a specific vehicle $A_1$ has traveled. For example, in the example illustrated in FIG. 6C(A), the freely selected route is a "route 1 for vehicle $A_1$." Then, the historical statistics processing unit 27 sets a circular area (range) that has a radius $r_S$ from the travel end point of the "route 1 for vehicle $A_1$" as a composite point area (range) $R_S$, and performs search for a route that has a travel start point within the composite point area (range) $R_S$ from among the routes along which the vehicle $A_1$ has traveled. When a route that has a travel start point within the composite point area (range) $R_S$ is searched for, the historical statistics processing unit 27 combines these routes to generate a combined route, and the generated combined route is accumulated in the driving history accumulation unit 26.

More specifically, in the example illustrated in FIG. 6C(A), the historical statistics processing unit 27 combines the "route 1 for vehicle $A_1$" and a "route 2 for vehicle $A_1$" that has a travel start point within the composite point area (range) $R_S$, thereby to generate a combined route that is composed of the "route 1 for vehicle $A_1$" and the "route 2 for vehicle $A_1$," and accumulates this combined route in the driving history accumulation unit 26. The radius $r_S$ is not particularly limited, but can be about 1 to 5 km. After generating the combined route in step S405, the process proceeds to step S403.

The travel start point and travel end point of a composite route in this case are respective ends of the composite route (excluding a point or points used for combining). More specifically, in the composite route that is composed of the "route 1 for vehicle $A_1$" and the "route 2 for vehicle $A_1$" illustrated in FIG. 6C(A), the travel start point of the "route 1 for vehicle $A_1$" is the travel start point of the composite route, and the travel end point of the "route 2 for vehicle $A_1$" is the travel end point of the composite route.

In the example illustrated in FIG. 6C(A), a case is exemplified in which two routes are combined, but the number of combined routes when obtaining a composite route is not limited to two and may be three or more. That is, for example, as in the example illustrated in FIG. 6C(B), a composite route may be obtained such that a "route 3 for vehicle $A_1$" is further combined with a composite route that is composed of the "route 1 for vehicle $A_1$" and the "route 2 for vehicle $A_1$." The "route 3 for vehicle $A_1$" has a travel start point within a composite point area (range) $R_S$ that is a circular area (range) having a radius $r_S$ from the travel end point of the "route 2 for vehicle $A_1$." The composite route can thus be generated which is composed of the "route 1 for vehicle $A_1$," the "route 2 for vehicle $A_1$," and the "route 3 for vehicle $A_1$." In the composite route obtained in such a manner, the travel start point of the "route 1 for vehicle A," is the travel start point of the composite route, and the travel end point of the "route 3 for vehicle $A_1$" is the travel end point of the composite route.

In the above, an example is exemplified in which the composite route is generated for a specific vehicle $A_1$, but also for other vehicles $A_2$, $A_3$, . . . than the vehicle $A_1$, as illustrated in FIG. 6B, the historical statistics processing unit 27 generates a composite route for each vehicle by combining a plurality of routes along which the vehicle has traveled, and the driving history accumulation unit 26 records the composite routes thus generated, thereby to accumulate the plurality of composite routes for respective vehicles.

In the above example, a circular area (range) that has a radius $r_S$ from the travel end point of a freely selected route is set as a composite point area (range) $R_S$, and a route that has a travel start point within the composite point area (range) $R_S$ is combined, but the composite point area (range) $R_S$ may be set as a rectangular area (range) that is configured to center the travel end point with the latitude of $\pm d1$ and the longitude of $\pm d2$. In an alternative embodiment, a mesh pattern may be set to delimit the latitude and longitude on an electronic map with a certain step, and a predetermined number of mesh areas (ranges) that center a travel end point can be set as each of a departure point area (range) $R_O$ and a destination point area (range) $R_D$.

Referring again to FIG. 6A, in step S403, the historical statistics processing unit 27 determines whether or not the route as a target for the charging facility statistical process (the route for the vehicle A in the case of the flow from step S402 to step S403 or the combined route in the case of the flow from step S405 to step S403, hereinafter also referred to as a "target route") is equivalent to a route that has been learned (accumulated in the driving history accumulation unit 26). With regard to the determination whether or not the target route is equivalent to a learned route, when the distance between two routes to be compared is not larger than a predetermined distance (e.g. several meters), for example, the target route is determined to be equivalent to the learned route. When the target route is equivalent to a learned route, the process proceeds to step S406, in which the driving history accumulation unit 26 accumulates the target route, followed by step S407.

On the other hand, when the target route for the vehicle A is not equivalent to a learned route, the process proceeds to step S408. In step S408, the historical statistics processing unit 27 makes a determination whether or not the target route falls under a predetermined range of time or predetermined range of distance compared with the shortest route between given charging facilities among the learned routes (accumulated routes in the driving history accumulation unit 26). When the target route does not fall under a predetermined range of time or predetermined range of distance compared with the shortest route between the given charging facilities among the learned routes, the charging facility statistical process ends. This operation can prevent an excessively long route from being presented as the presentation route for the route between the given charging facilities.

When the target route falls under a predetermined range of time or predetermined range of distance compared with the shortest route between the given charging facilities among the learned routes, step S408 is followed by step S409, in which the target route is accumulated as a new route, and the process then proceeds to step S407.

In step S407, the historical statistics processing unit 27 refers to the information (the first driving history information, the second driving history information) accumulated in the driving history accumulation unit 26 to calculate average values (simple average) of the travel time, travel distance and power consumption when the vehicle A travels along a route that is equivalent to the target route. The process then proceeds to step S410.

In step S410, the historical statistics processing unit 27 performs calculation of average values when traveling between two charging facilities connected by the target route. That is, the historical statistics processing unit 27 performs calculation of average values (weighted average for each route) when traveling along various routes including the target route. Specifically, it is assumed that, as a result of search with reference to the information (the first driving history information, the second driving history information) accumulated in the driving history accumulation unit 26, there are, for example, three types of routes (hereinafter, referred to as a "route α," a "route β," and a "route γ") including the target route as routes that connect a charging facility A and a charging facility B. It is also assumed that the numbers of times the vehicle A used the routes α, β, and γ including the target route until now are $m_1$, $m_2$, and $m_3$, respectively. In this case, the historical statistics processing unit 27 performs calculation of an average power consumption, an average travel distance, and an average travel time between the charging facilities A and B in accordance with Equations (1) to (3) below. Also when there are two or four or more types of routes that connect two charging facilities, the historical statistics processing unit 27 performs calculation of weighted average values for respective routes in the same manner.

$$Y_1=((X_{\alpha 1} \times m_1)+(X_{\beta 1} \times m_2)+(X_{\gamma 1} \times m_3))/(m_1+m_2+m_3) \quad (1)$$

$$Y_2=((X_{\alpha 2} \times m_1)+(X_{\beta 2} \times m_2)+(X_{\gamma 2} \times m_3))/(m_1+m_2+m_3) \quad (2)$$

$$Y_3=((X_{\alpha 3} \times m_1)+(X_{\beta 3} \times m_2)+(X_{\gamma 3} \times m_3))/(m_1+m_2+m_3) \quad (3)$$

In the above Equation (1), $Y_1$ is the average power consumption of the vehicle A along the route between the charging facilities A and B, $X_{\alpha 1}$ is the power consumption of the vehicle A along the route α, $X_{\beta 1}$ is the power consumption of the vehicle A along the route β, and $X_{\gamma 1}$ is the power consumption of the vehicle A along the route γ. In the above Equation (2), $Y_2$ is the average travel distance of the route between the charging facilities A and B, $X_{\alpha 2}$ is the travel distance of the route α, $X_{\beta 2}$ is the travel distance of the route β, and $X_{\gamma 2}$ is the travel distance of the route γ. In the above Equation (3), $Y_3$ is the average travel time when traveling along the route between the charging facilities A and B, $X_{\alpha 3}$ is the travel time when traveling along the route α, $X_{\beta 3}$ is the travel time when traveling along the route β, and $X_{\gamma 3}$ is the travel time when traveling along the route γ.

In an alternative embodiment, the historical statistics processing unit 27 may perform the calculations of the above Equations (1) to (3) only using the information (the first driving history information, the second driving history information) provided from a vehicle A having travel conditions that are closest to those of the host vehicle A. Examples of such travel conditions include the altitude detected by the altitude detector 8 of the vehicle A, the vehicle speed detected by the vehicle speed detector 9, the air conditioner usage detected by the air conditioner usage detector 10, the temperature detected by the temperature detector 7, and the season, travel time zone and weather when traveling. In this alternative embodiment, the search for a similar route can be performed with reference to data that is close to the situation of the host vehicle A, and the reliability of results obtained by the search is therefore improved.

Then, in step S411, data of corresponding section in the control map M is updated using the data of the average power consumption, average travel distance and average travel time calculated in step S410. In the above example, the power consumption $P_{AB}$, travel distance $Q_{AB}$, and travel time $R_{AB}$ (see FIG. 2B) in the section (charging facility A-charging facility B) are substituted with $Y_1$, $Y_2$, and $Y_3$, respectively. This allows improvement in the accuracy of data of the average power consumption, average travel distance and average travel time in a route that can be actually used when traveling between the charging facilities.

<Driving History Statistical Process>

Figure 7A:
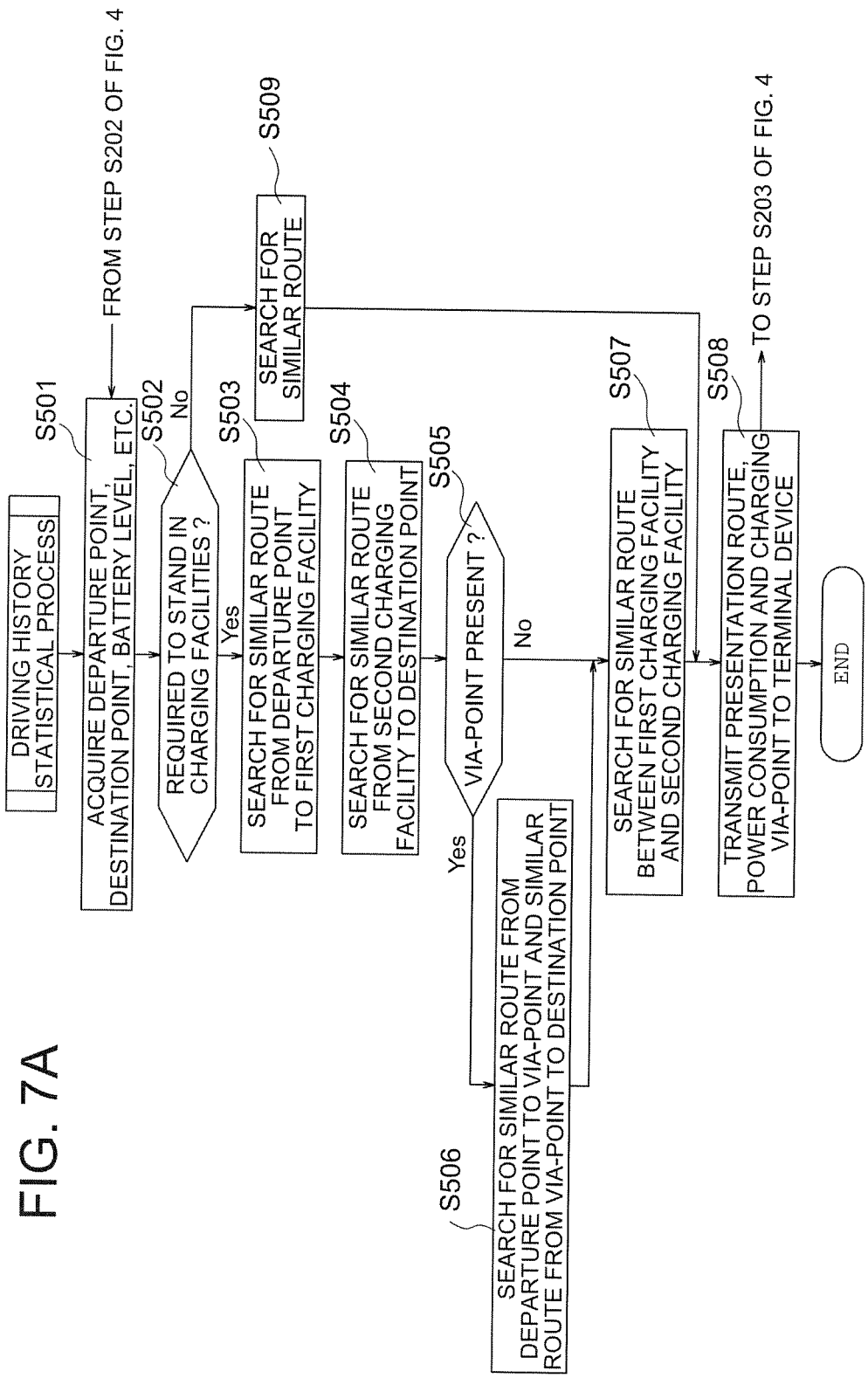
FIG. 7A is a flowchart illustrating a procedure of the driving history statistical process executed by the historical statistics processing unit of FIG. 1 (subroutine of step S50 of FIG. 2C).

FIG. 7A is a flowchart illustrating a subroutine of the driving history statistical process (step S50) of FIG. 2C, and FIGS. 7B(A)-7B(B) are views for explaining a search method for similar routes. The driving history statistical process is executed by the historical statistics processing unit 27 of the vehicle information providing device 3. When receiving the presentation route search request transmitted by the terminal device 2 (step S202 of FIG. 4), the historical statistics processing unit 27 executes the history statistical process as below.

As illustrated in FIG. 7A, in step S501, the historical statistics processing unit 27 acquires (receives) the departure point $P_O$ and the destination point $P_D$ from the terminal device 2. Next, the historical statistics processing unit 27 acquires a planned route from the acquired departure point $P_O$ to destination point $P_D$ and the like on the basis of the map information which is stored by the map information storage unit 25. The planned route may be any route that allows arrival at the destination point $P_D$ from the departure point $P_O$ and is not particularly limited. For example, there is set a route that can be traveled between the departure point $P_O$ and the destination point $P_D$ in the shortest time or the shortest distance.

In one or more embodiments of the present invention, an example is described in which the historical statistics processing unit 27 provided in the vehicle information providing device 3 searches for (acquires) the planned route, but another configuration may also be employed. For example, the navigation device 18 provided in the in-vehicle device 1 may be configured to search for the planned route. In this case, the navigation device 18 transmits the search result of the planned route to the historical statistics processing unit 27, and the historical statistics processing unit 27 receives (acquires) the planned route transmitted from the navigation device 18.

In step S501, the historical statistics processing unit 27 also acquires the battery level information from the received presentation route search request. The method for acquiring the battery level information may be a method for making an inquiry to the battery level detector 11 of the vehicle A from the terminal device 2 via the data center B or a method in which the user inputs an arbitrary battery level. According to the former method, the calculation can be done on the basis of the most recent battery level when actually departing, and a result can therefore be obtained in line with the state at the current time. According to the latter method, the user can specify the battery level beforehand, and a result can therefore be obtained, for example, on the assumption of a departure after the battery is fully charged.

Next, the operation proceeds to step S502. In step S502, the charging frequency determining unit 271 of the historical statistics processing unit 27 determines whether or not the vehicle A has to stand in charging facilities when the vehicle A travels from the departure point $P_O$ to the destination point $P_D$, on the basis of the information regarding the traveling performance of the vehicle A and the battery level of the vehicle A. When the charging frequency determining unit 271 determines that the vehicle A has to stand in charging facilities when the vehicle A travels from the departure point $P_O$ to the destination point $P_D$ (step S502=Yes), the process proceeds to step S503.

In step S503, the historical statistics processing unit 27 refers to the information (the first driving history information, the second driving history information) accumulated in the driving history accumulation unit 26 to search for a similar route from the departure point $P_O$ to a charging facility that is nearest to the departure point $P_O$ (hereinafter also referred to as a "first charging facility $P_{J1}$"). This search can be, for example, performed as follows. The historical statistics processing unit 27 sets a departure point area (range) $R_O$ on the basis of the information regarding the departure point $P_O$ included in the received presentation route search request. The historical statistics processing unit 27 also sets a destination point area (range) $R_{J1}$ on the basis of the information regarding the first charging facility $P_{J1}$. As illustrated in FIG. 7B(A), in one or more embodiments of the present invention, the historical statistics processing unit 27 sets a circular area (range) having a predetermined radius $r_O$ from the departure point $P_O$ as the departure point area (range) $R_O$ and sets a circular area (range) having a predetermined radius $r_{J1}$ from the first charging facility $P_{J1}$ as the destination point area (range) $R_{J1}$.

Next, the historical statistics processing unit 27 searches for a route that has a travel start point and a travel end point within the set departure point area (range) $R_O$ and area (range) $R_{J1}$ from among the first driving history information (routes) accumulated by the driving history accumulation unit 26, and detects the searched route as a similar route to the nearest charging facility. Specifically, the historical statistics processing unit 27 sets a route of which the travel start point is within the departure point area (range) $R_O$ and the travel end point is within the area (range) $R_{J1}$ as the similar route. For example, FIG. 7B(A) illustrates an example in which two routes of a "similar route 1" and a "similar route 2" are detected for the planned route which connects the departure point $P_O$ and the nearest charging facility $P_{J1}$.

In one or more embodiments of the present invention, the radius $r_O$ and radius $r_{J1}$, which define the size (largeness) of the departure point area (range) $R_O$ and the area (range) $R_{J1}$, can each be set to a predetermined distance (for example, 5 km). According to one or more embodiments of the present invention, by setting and using the departure point area (range) $R_O$ and the area (range) $R_{J1}$, which each have a predetermined area (range), when setting a similar route in this way, it is possible to avoid situations in which there is no corresponding similar route in the first driving history information (routes) accumulated by the driving history accumulation unit 26. This allows appropriate setting of a similar route to the nearest charging facility $PJ_1$. In an alternative embodiment, the first charging facility may be set as a charging facility at which the vehicle A can arrive from the departure point $P_O$ without being charged from external. If a similar route is not searched for in step S503, a planned route from the departure point to the first charging facility may be set as a part of the presentation route.

Next, in step S504, the historical statistics processing unit 27 refers to the information (the first driving history information, the second driving history information) accumulated in the driving history accumulation unit 26 to search for a similar route from the destination point $P_D$ to a charging facility that is nearest to the destination point $P_D$ (hereinafter also referred to as a "second charging facility $P_{J2}$"). This search can be performed in the same manner as that in the above-described step S503. If a similar route is not searched for in step S504, a planned route from the second charging facility to the destination point may be set as a part of the presentation route.

Next, in step S505, the historical statistics processing unit 27 refers to the information transmitted from the route calculation unit 23 of the terminal device 2 to determine whether or not there is a via-point between the departure point $P_O$ and the destination point $P_D$. When a determination is made that there is a via-point (step S505=Yes), the process proceeds to step S506. When a determination is made that there is not a via-point (step S505=No), the process proceeds to step S507.

In step S506, a similar route from the first charging facility $P_{J1}$ to the via-point and a similar route from the via-point to the second charging facility $P_{J2}$ are searched for. Such search for similar routes is performed in the same method as described in the above-described step S503. If, in step S506, a similar route from the first charging facility $P_{J1}$ to the via-point and a similar route from the via-point to the second charging facility $P_{J2}$ are not searched for, planned routes in these sections may be set as respective parts of the presentation route.

Next, in step S507, referring to the control map M stored by the map memory 261 of the driving history accumulation unit 26, the historical statistics processing unit 27 searches for a similar route from the first charging facility $P_{J1}$ to the second charging facility $P_{J2}$. FIGS. 8A-8B and FIGS. 9A-9B are views for explaining search for routes using the control map M.

Figure 8A:
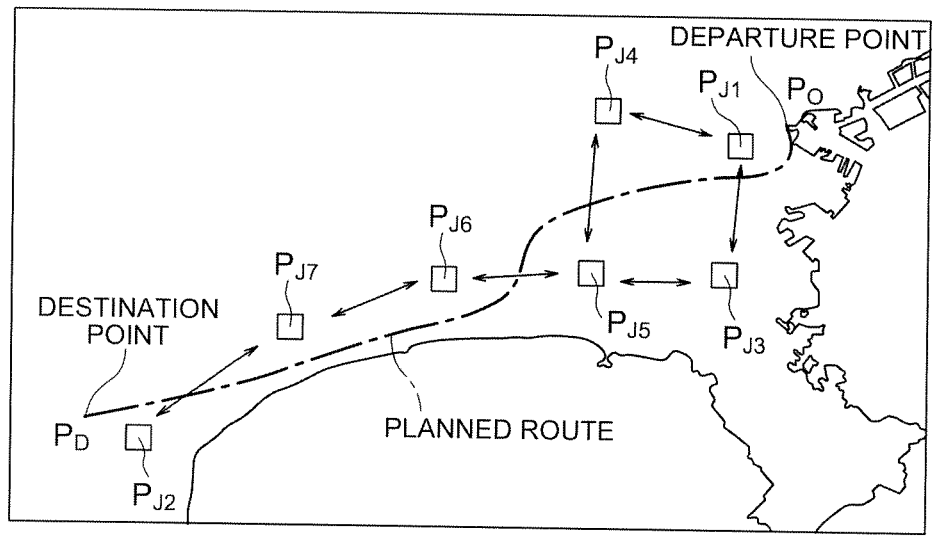
FIGS. 8A-8B are views for explaining a search method for routes using a control map.

In step S507, when a determination is made that there is not a via-point in step S505, the historical statistics processing unit 27 refers to the control map M stored in the map memory 261 to combine, as illustrated FIG. 8A, a plurality of routes that each connect two charging facilities (each route is the route of section). In this way, the historical statistics processing unit 27 performs search for a route that connects the first charging facility $P_{J1}$ and the second charging facility $P_{J2}$. During this operation, the historical statistics processing unit 27 may perform search for a route that connects the first charging facility $P_{J1}$ and the second charging facility $P_{J2}$ by using only routes (routes of sections) that connect charging facilities located within a predetermined range of distance from the planned route. This can mitigate the search load by the historical statistics processing unit 27. FIG. 8A illustrates an example in which there are five charging facilities (charging facilities $P_{J3}$ to $P_{J7}$) as those located within a predetermined range of distance from the planned route between the first charging facility $P_{J1}$ and the second charging facility $P_{J2}$.

When this search results in a plurality of combinations of routes of sections that connect the first charging facility $P_{J1}$ and the second charging facility $P_{J2}$, the similar route (presentation route) is determined in accordance with a condition to which the route searcher (such as the driver) gives priority. For example, when the route searcher gives the highest priority to suppressing the power consumption when traveling along the similar route, the historical statistics processing unit 27 refers to the control map M to select a combination of the routes of sections that minimizes the total sum of the power consumption in respective routes of sections which constitute the route connecting the first charging facility $P_{J1}$ and the second charging facility $P_{J2}$. In this way, the historical statistics processing unit 27 searches for the similar route from the first charging facility $P_{J1}$ to the second charging facility $P_{J2}$.

Figure 8B:
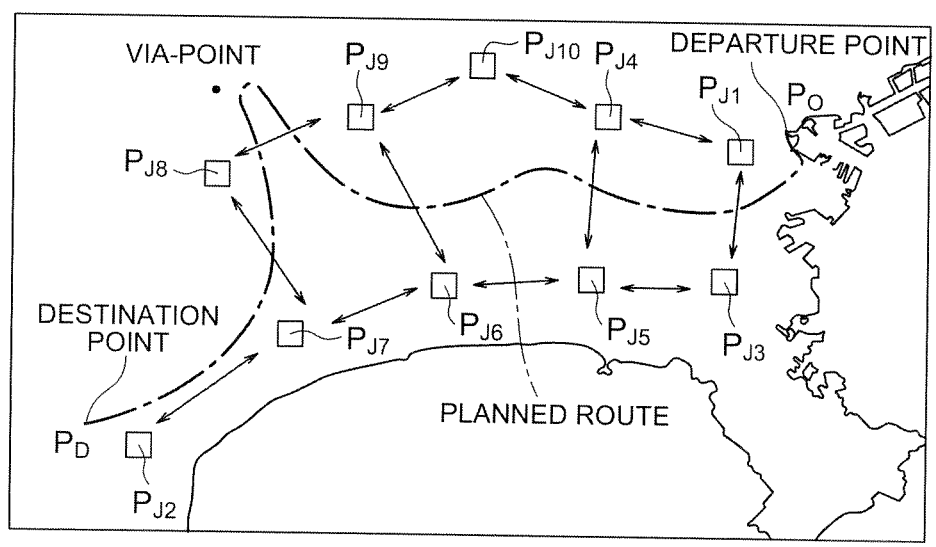

In step S507, also when a determination is made that there is a via-point in step S505, the search for a similar route is performed in the same manner as the above. That is, as illustrated in FIG. 8B, the historical statistics processing unit 27 refers to the control map M stored in the map memory 261 to combine a plurality of routes that each connect two charging facilities located within a predetermined range of distance from the planned route (each route is the route of section). In this way, the historical statistics processing unit 27 performs search for a route that connects the first charging facility $P_{J1}$ and the second charging facility $P_{J2}$. Also during this operation, when the search results in a plurality of combinations of routes of sections that connect the first charging facility $P_{J1}$ and the second charging facility $P_{J2}$, the historical statistics processing unit 27 determines the similar route (presentation route) in accordance with a condition to which the route searcher (such as the driver) gives priority. FIG. 8B illustrates an example in which there are eight charging facilities (charging facilities $P_{J3}$ to $P_{J10}$) as those located within a predetermined range of distance from the planned route between the first charging facility $P_{J1}$ and the second charging facility $P_{J2}$.

Next, in step S508, the historical statistics processing unit 27 transmits (provides) the search results in the above-described steps S503, S504, and S507 to the originating terminal device 2, and the driving history statistical process ends. If, in step S507, there is not a route that connects the first charging facility $P_{J1}$ and the second charging facility $P_{J2}$ as a combination of routes of sections within the control map M, the routes of sections lacking may be connected by the planned route.

Referring again to step S502, when the charging frequency determining unit 271 determines that the vehicle A need not stand in charging facilities when the vehicle A travels from the departure point $P_O$ to the destination point $P_D$ (step S502=No), the process proceeds to step S509.

In step S509, the historical statistics processing unit 27 performs search for a similar route that connects the departure point $P_O$ and the destination point $P_D$. The search for the similar route is performed in the same method as that in the above-described step S503. Then, the process proceeds to step S508, and when a similar route is searched for in step S509, the historical statistics processing unit 27 transmits (provides) the similar route to the originating terminal device 2, and the driving history statistical process ends. When a similar route is not searched for in step S509, the historical statistics processing unit 27 transmits (provides) the fact that a similar route is not searched for to the originating terminal device 2, and the driving history statistical process ends.

As heretofore described, in one or more embodiments of the present invention, the historical statistics processing unit 27 calculates the power that is consumed when traveling along the searched, planned route, on the basis of the first driving history information for a specified driver from among the first driving history information accumulated by the driving history accumulation unit 26. Therefore, the driver can be provided with information of more appropriate power consumption.

Moreover, in one or more embodiments of the present invention, the historical statistics processing unit 27 determines whether or not the vehicle A has to stand in charging facilities when the vehicle A travels from the departure point $P_O$ to the destination point $P_D$. When a determination is made that the vehicle A has to stand in charging facilities, the historical statistics processing unit 27 refers to the control map M stored in the map memory 261 to select a combination of routes of sections, thereby searching for a route between the first charging facility and the second charging facility. Therefore, even during such a long travel that requires standing in charging facilities on the way, a route can be selected which allows traveling with efficient power consumption. It is also possible to drastically mitigate the concern that the battery power runs down during the travel. Furthermore, the route can be selected between the first charging facility and the second charging facility in accordance with the conditions the driver desires (such as mitigated power consumption, reduced travel distance, and reduced travel time).

Embodiments heretofore explained are described to facilitate understanding of the present invention and are not described to limit the present invention. Therefore, it is intended that the elements disclosed in the above embodiments include all design changes and equivalents to fall within the technical scope of the present invention.

Figure 9A:
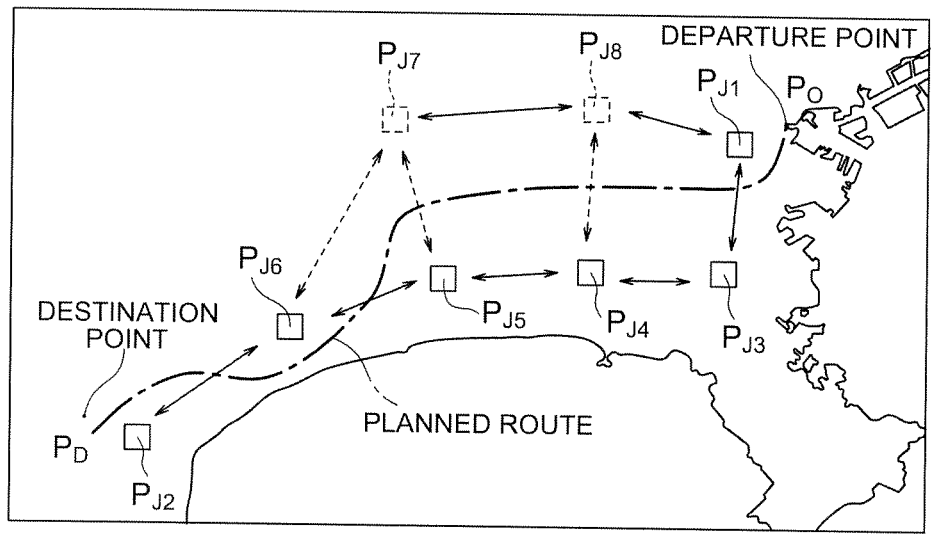
FIGS. 9A-9B is a set of views for explaining another example of a search method for routes using the control map.

For example, the vehicle information providing device 3 may be provided with an arrival time estimation unit that estimates the arrival time of the vehicle A at each charging facility and an opening hours estimation unit that stores the opening hours of each charging facility. In this case, when a determination is made that the vehicle A has to stand in the charging facilities in step S502 of the driving history statistical process, the historical statistics processing unit 27 may extract, from the control map stored in the map memory 261, charging facilities that are in the opening hours at the time estimated by the arrival time estimation unit, and select a combination of routes that connect the extracted charging facilities, thereby to search for a similar route (see FIG. 9A). FIG. 9A illustrates an example in which charging facilities $P_{J1}$ to $P_{J6}$ are extracted as those that are in the opening hours at the estimated arrival time of the vehicle A, and charging facilities $P_{J7}$ and $P_{J8}$ are extracted as those that are outside the opening hours at the estimated arrival time of the vehicle A.

This can avoid a situation in which, when the vehicle A arrives at a charging facility, the charging facility is outside the opening hours. The map memory may store a plurality of control maps for time zones which list only the charging facilities that are in the opening hours, so that the historical statistics processing unit 27 may refer to a control map that corresponds to the estimated arrival time of the vehicle A at a charging facility from among the plurality of control maps, to search for a similar route.

Figure 9B:
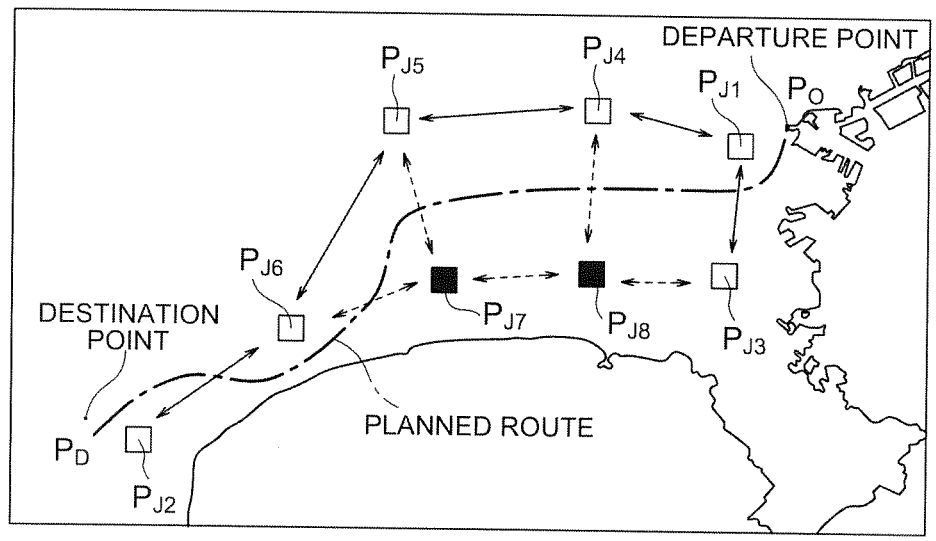

In an alternative embodiment, for example, the vehicle information providing device 3 may be provided with an arrival time estimation unit that estimates the arrival time of the vehicle A at each charging facility and an occupied/unoccupied state determining unit that determines whether or not the usage situation of each charging facility is in an unoccupied state. In this case, when a determination is made that the vehicle A has to stand in the charging facilities in step S502 of the driving history statistical process, the historical statistics processing unit 27 may extract, from the control map stored in the map memory 261, charging facilities that are determined to be in the unoccupied state at the time estimated by the arrival time estimation unit, and select a combination of routes that connect the extracted charging facilities, thereby to search for a similar route (see FIG. 9B). FIG. 9B illustrates an example in which charging facilities $P_{J1}$ to $P_{J6}$ are extracted as those of which the usage situation is in the unoccupied state at the estimated arrival time of the vehicle A, and charging facilities $P_{J7}$ and $P_{J8}$ are extracted as those of which the usage situation is in the occupied state at the estimated arrival time of the vehicle A. This can avoid a situation in which, when the vehicle A arrives at a charging facility, the usage situation of the charging facility is in the occupied state.

In the above-described embodiments, the vehicle information providing system S corresponds to an example of the vehicle information providing device of one or more embodiments of the present invention, the driving history accumulation unit 26 corresponds to an example of the history information accumulation unit of one or more embodiments of the present invention, the input unit 22 corresponds to an example of the input unit of one or more embodiments of the present invention, the historical statistics processing unit 27 corresponds to an example of the planned route acquisition unit and the search unit of one or more embodiments of the present invention, and the charging frequency determining unit 271 corresponds to an example of the charging necessity determining unit of one or more embodiments of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

DESCRIPTION OF REFERENCE NUMERALS

A Vehicle
S Vehicle information providing system
1 In-vehicle device
4 Accelerator opening detector
5 Position detector
6 Switch state detector
7 Temperature detector
8 Altitude detector
9 Vehicle speed detector
10 Air conditioner usage detector
11 Battery level detector
12 Driver detector
13 Electric motor
14 Battery (for driving)
15 Vehicle controller
16 Charge/discharge controller
17 Charge/discharge circuit
18 Navigation device
19 Driving history recorder
20 Charging connector
C Charging facility
21 Charging device
2 Terminal device
22 Input unit
23 Route calculation unit 24 Display
B Data center
3 Vehicle information providing device
25 Map information storage unit
26 Driving history accumulation unit
27 Historical statistics processing unit
261 Map memory
271 Charging necessity determining unit (charging frequency determining unit)
$P_O$ Departure point
$P_D$ Destination point
$R_O$ Departure point area (range)
$R_D$ Destination point area (range)
$P_J$ Charging facility

The invention claimed is:

1. A vehicle route determination method, comprising:
acquiring driving history information comprising a driving location information, a power consumption information, and a charging facility information from an in-vehicle device of a vehicle having at least an electric motor as a traveling drive source;
accumulating the driving history information as accumulated driving history information;
acquiring at least a departure point and a destination point;
determining a planned route from the departure point to the destination point;
associating in a control map a section of a route and a characteristic value with each other on a basis of the accumulated driving history information, the section of the route connecting any two charging facilities that belong to a charging facility group including a plurality of charging facilities, the characteristic value including travel distance information, power consumption information, and travel time information, and the characteristic value correlating with power consumption of the electric motor when the vehicle travels along the section of the route;
calculating an average value of the travel distance information, the power consumption information, and the travel time information included in the driving history information and updating the control map, when the driving history information include the section of the route that is equivalent to the section of the route accumulated;
determining from the accumulated driving history information whether or not the vehicle has to stand in the charging facilities when traveling from the departure point to the destination point; and
displaying a presentation route, comprising a plurality of route sections, that is the same or similar to the planned route,
wherein, when the determination is made that the vehicle has to stand in at least one of the charging facilities, selecting, based on the control map, a combination of the plurality of route sections.

2. The vehicle route determination method according to claim 1,
wherein based on the accumulated driving history information, searching for the presentation route between the charging facility at which the vehicle can arrive from the departure point without being charged from external and the departure point and between the charging facility from which the vehicle can arrive at the destination point without being charged from external and the destination point.

3. The vehicle route determination method according to claim 1, further comprising:
determining whether or not each charging facility that belongs to the charging facility group is in opening hours at a time when the vehicle arrives at the charging facility,
wherein, when determining that the vehicle has to stand in the charging facilities, selecting a combination of the route sections connecting the charging facilities that are determined to be in the opening hours.

4. The vehicle route determination method according to claim 1, further comprising:
determining whether or not a usage situation of each charging facility that belongs to the charging facility group is in an unoccupied state at a time when the vehicle arrives at the charging facility,
wherein, when determining that the vehicle has to stand in the charging facilities, selecting a combination of the route sections connecting the charging facilities of which the usage situation is determined to be in the unoccupied state.

5. The vehicle route determination method according to claim 1, wherein, when determining that the vehicle has to stand in the charging facilities and there is a plurality of the route sections in the same section, selecting the section of the route on the basis of the accumulated driving history information of the vehicle having a travel condition that is closest to a travel condition of a host vehicle.

6. The vehicle route determination method according to claim 1, further comprising: calculating a weighted average value of at least one of the driving location information, the power consumption information and the charging facility information included in the accumulated driving history information on a basis of a number of times the vehicle has used the route and updating the control map, when there are different route sections.

* * * * *